US011886588B2

(12) United States Patent
Hirano et al.

(10) Patent No.: US 11,886,588 B2
(45) Date of Patent: Jan. 30, 2024

(54) INTRUSION POINT IDENTIFICATION DEVICE AND INTRUSION POINT IDENTIFICATION METHOD

(71) Applicant: Panasonic Intellectual Property Corporation of America, Torrance, CA (US)

(72) Inventors: Ryo Hirano, Osaka (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 537 days.

(21) Appl. No.: 17/094,377

(22) Filed: Nov. 10, 2020

(65) Prior Publication Data

US 2021/0056206 A1 Feb. 25, 2021

Related U.S. Application Data

(63) Continuation of application No. PCT/JP2019/037396, filed on Sep. 24, 2019.
(Continued)

(51) Int. Cl.
*G06F 21/00* (2013.01)
*G06F 21/56* (2013.01)
*G01C 21/36* (2006.01)

(52) U.S. Cl.
CPC .......... *G06F 21/566* (2013.01); *G01C 21/36* (2013.01); *G06F 2221/034* (2013.01)

(58) Field of Classification Search
CPC ................. G06F 21/552; G06F 21/566; G06F 2221/034; G01C 21/3697; G01C 21/36; H04W 12/12
See application file for complete search history.

(56) References Cited

U.S. PATENT DOCUMENTS

2015/0358351 A1   12/2015   Otsuka et al.

FOREIGN PATENT DOCUMENTS

JP        2014-146868         8/2014

OTHER PUBLICATIONS

IEEE NPL (Year: 2010).*
(Continued)

*Primary Examiner* — Tri M Tran
(74) *Attorney, Agent, or Firm* — WENDEROTH, LIND & PONACK, L.L.P.

(57) ABSTRACT

An intrusion point identification device includes: a threat information collector that collects and stores threat information including identification information identifying a moving body, route information indicating a route through which the threat has intruded into the moving body, and discovery information indicating a discovery date of an attack; a vehicle log collector that collects logs, extracts, from the logs, histories of points that indicate locations of one or more moving bodies within a predetermined period, and stores the histories of the points as history information, the logs indicating points that indicate locations of the one or more moving bodies, the predetermined period being set based on the discovery information; an intrusion point identification unit that identifies an intrusion point of the threat from a first attack source through a first route among the points indicated in the history information; and an intrusion point notifier that outputs the intrusion point.

15 Claims, 13 Drawing Sheets

Related U.S. Application Data

(60) Provisional application No. 62/746,834, filed on Oct. 17, 2018.

(56) References Cited

OTHER PUBLICATIONS

Waidner NPL (Year: 2014).*
Extended European Search Report dated Nov. 5, 2021 in corresponding European Patent Application No. 19873719.9.
Norbert Bißmeyer et al., "Intrusion detection in VANETs through verification of vehicle movement data", IEEE Vehicular Networking Conference, Dec. 2010, pp. 166-173.
Norbert Bißmeyer, "Misbehavior Detection and Attacker Identification in Vehicular Ad hoc Networks", Darmstädter Dissertation, Nov. 2014, pp. 7-10.
International Search Report (ISR) dated Dec. 24, 2019 in International (PCT) Application No. PCT/JP2019/037396.

* cited by examiner

FIG. 3

| THREAT INFORMATION NUMBER | ATTACK SOURCE CLASS | SEVERITY LEVEL OF VULNERABILITY | THREAT CATEGORY | ATTACK DISCOVERY DATE | INCUBATION PERIOD | VEHICLE IDENTIFICATION NUMBER | VEHICLE TYPE |
|---|---|---|---|---|---|---|---|
| 1 | PHYSICAL | 7 | UNAUTHORIZED OBD2 DEVICE | 2018/9/1 | 4 DAYS | A001 | A |
| 2 | LOCAL | 6 | UNAUTHORIZED CHARGING DEVICE | 2018/10/1 | 5 DAYS | B001 | B |
| 3 | LOCAL | 5 | UNAUTHORIZED CHARGING DEVICE | 2018/11/1 | 6 DAYS | C001 | C |
| 4 | NETWORK | 1 | PHISHING WEBSITE | 2018/12/1 | UNKNOWN | D001 | D |
| ... | ... | ... | ... | ... | | ... | ... |

FIG. 4

| VEHICLE IDENTIFICATION NUMBER | TIME | POSITION INFORMATION | VEHICLE STATUS |
|---|---|---|---|
| A001 | T11 | POINT A (N1", E1") | TRAVELLING(10km/h) |
|  | T12 | POINT B (N2", E2") | TRAVELLING(20km/h) |
|  | ... | ... | ... |
|  | T13 | POINT C (N3", E3") | TRAVELLING(30km/h) |
| B001 | T21 | POINT D (N1", W1") | STOPPED(0km/h) |
|  | T22 | POINT E (N1", W2") | TRAVELLING(10km/h) |
|  | ... | ... | ... |
|  | T23 | POINT F (N3", W3") | TRAVELLING(20km/h) |
| C001 | T31 | POINT G (N3", W1") | TRAVELLING(20km/h) |
|  | T32 | POINT H (N2", W1") | TRAVELLING(20km/h) |
|  | ... | ... | ... |
|  | T33 | POINT D (N1", W1") | STOPPED(0km/h) |
| D001 | T41 | POINT J (S1", E1") | TRAVELLING(5km/h) |
|  | T42 | POINT K (S2", E2") | STOPPED(0km/h) |
|  | ... | ... | ... |
|  | T43 | POINT L (S3", E3") | TRAVELLING(20km/h) |
| ... | ... | ... | ... |

FIG. 5

| THREAT INFORMATION NUMBER | THREAT CATEGORY | VEHICLE IDENTIFICATION NUMBER | POSITION INFORMATION | ANOMALY SCORE CALCULATION VALUE | | | | |
|---|---|---|---|---|---|---|---|---|
| | | | | REFERENCE POINT | ADDED POINT FOR SEVERITY LEVEL | ADDED POINT FOR VEHICLE STATUS | TOTAL NUMBER OF VEHICLES | ANOMALY SCORE |
| 1 | UNAUTHORIZED OBD2 DEVICE | A001 | POINT A (N1″, E1″) | 1 | 7 | 0 | 100 | 0.08 |
| | | | POINT B (N2″, E2″) | 1 | 7 | 0 | 100 | 0.08 |
| | | | ... | ... | ... | ... | ... | ... |
| | | | POINT C (N3″, E3″) | 1 | 7 | 0 | 200 | 0.04 |
| 2 | UNAUTHORIZED CHARGING DEVICE | B001 | POINT D (N1″, W1″) | 1 | 6 | 1 | 10 | 0.8 |
| | | | POINT E (N1″, W2″) | 1 | 6 | 0 | 100 | 0.07 |
| | | | ... | ... | ... | ... | ... | ... |
| | | | POINT F (N3″, W3″) | 1 | 6 | 0 | 100 | 0.07 |
| 3 | UNAUTHORIZED CHARGING DEVICE | C001 | POINT G (N3″, W1″) | 1 | 5 | 0 | 100 | 0.06 |
| | | | POINT H (N2″, W1″) | 1 | 5 | 0 | 100 | 0.06 |
| | | | ... | ... | ... | ... | ... | ... |
| | | | POINT D (N1″, W1″) | 1 | 5 | 1 | 10 | 0.7 |
| 4 | PHISHING WEBSITE | D001 | POINT J (S1″, E1″) | 0 | — | — | 100 | 0 |
| | | | POINT K (S2″, E2″) | 0 | — | — | 100 | 0 |
| | | | ... | ... | ... | ... | ... | ... |
| | | | POINT L (S3″, E3″) | 0 | — | — | 100 | 0 |
| ... | ... | ... | ... | ... | ... | ... | ... | ... |

FIG. 6

| THREAT CATEGORY | POINT | ANOMALY SCORE | | | | CUMULATIVE ANOMALY SCORE |
|---|---|---|---|---|---|---|
| | | THREAT INFORMATION NO. 1 | THREAT INFORMATION NO. 2 | THREAT INFORMATION NO. 3 | THREAT INFORMATION NO. 4 | |
| UNAUTHORIZED OBD2 DEVICE | POINT A (N1", E1") | 0.08 | — | — | — | 0.08 |
| | POINT B (N2", E2") | 0.08 | — | — | — | 0.08 |
| | POINT C (N3", E3") | 0.04 | — | — | — | 0.04 |
| UNAUTHORIZED CHARGING DEVICE | POINT D (N1", W1") | — | 0.8 | 0.7 | — | 1.5 |
| | POINT E (N1", W2") | — | 0.07 | | — | 0.07 |
| | POINT F (N2", W1") | — | — | 0.06 | — | 0.06 |
| | POINT G (N3", W1") | — | — | 0.06 | — | 0.06 |
| | POINT H (N3", W3") | — | 0.07 | — | — | 0.07 |
| PHISHING WEBSITE | POINT I (S1", E1") | — | — | — | 0 | 0 |
| | POINT J (S2", E2") | — | — | — | 0 | 0 |
| | POINT K (S3", E3") | — | — | — | 0 | 0 |
| ... | ... | ... | ... | ... | ... | ... |

INTRUSION POINT IDENTIFICATION DEVICE AND INTRUSION POINT IDENTIFICATION METHOD

CROSS REFERENCE TO RELATED APPLICATIONS

This application is a U.S. continuation application of PCT International Patent Application Number PCT/JP2019/037396 filed on Sep. 24, 2019, claiming the benefit of priority of U.S. Provisional Patent Application No. 62/746,834 filed on Oct. 17, 2018, the entire contents of which are hereby incorporated by reference.

BACKGROUND

1. Technical Field

The present disclosure relates to intrusion point identification devices and intrusion point identification methods.

2. Description of the Related Art

There is technology to provide a defense against the threat of unauthorized control of vehicles (refer to Japanese Unexamined Patent Application Publication No. 2014-146868).

SUMMARY

There is the problem that identifying an intrusion point from an attack discovery point is not easy because vehicles are moving bodies and the period between an intrusion and attack damage discovery is not fixed.

Thus, the present disclosure provides an intrusion point identification device, etc., which identifies the intrusion point of a threat that has intruded into a moving body.

An intrusion point identification device according to one aspect of the present disclosure identifies an intrusion point at which a threat intrudes into one or more moving bodies, each of the one or more moving bodies including a plurality of routes through which the threat may have intruded, the plurality of routes possibly including a first route through which the threat has intruded from a first attack source located within a predetermined distance from the moving body, and includes: an information collector that collects and stores threat information including identification information, route information, and discovery information, the identification information identifying a moving body into which the threat has intruded among the one or more moving bodies, the route information indicating a route through which the threat has intruded into the moving body among the plurality of routes included in the moving body, the discovery information indicating a discovery date of an attack by the threat that has intruded into the moving body; a log collector that collects logs, extracts, from the logs collected, histories of points that indicate locations of the one or more moving bodies within a predetermined period, and stores the histories of the points as history information, the logs indicating points that indicate locations of the one or more moving bodies in association with dates and times, the predetermined period being set based on the discovery information; an identification unit configured to identify an intrusion point of the threat from the first attack source through the first route among the points indicated in the history information stored in the log collector; and an outputter that outputs the intrusion point identified by the identification unit.

Note that these general and specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

The intrusion point identification device according to the present disclosure is capable of identifying the intrusion point of a threat that has intruded into a moving body.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a diagram illustrating one example of threat information according to an embodiment.

FIG. 4 is a diagram illustrating one example of a vehicle log according to an embodiment.

FIG. 5 is a diagram illustrating one example of an anomaly score according to an embodiment.

FIG. 6 is a diagram illustrating one example of a cumulative anomaly score according to an embodiment.

Figure 1:
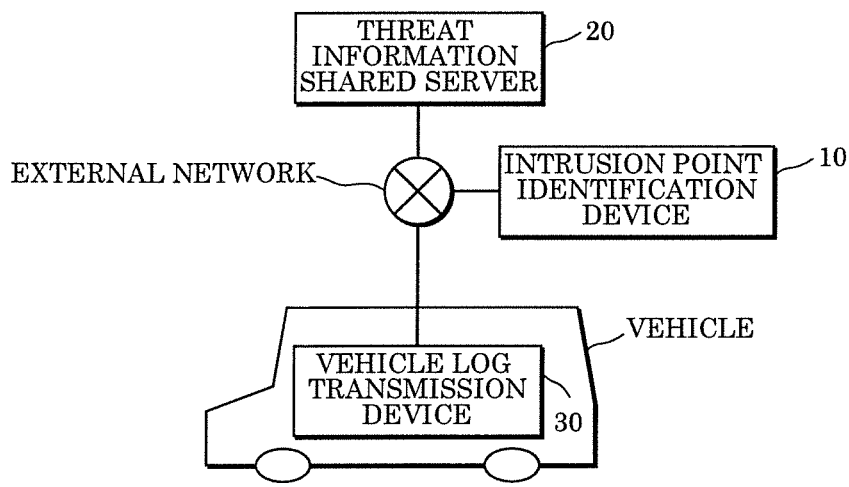
FIG. 1 is a diagram of the overall configuration of an intrusion point identification system for cyberattacks according to an embodiment.

DETAILED DESCRIPTION OF THE EMBODIMENTS (Underlying Knowledge Forming Basis of the Present Disclosure)

The inventors have discovered the following problems that occur with respect to the technology, disclosed in the BACKGROUND ART section, to provide a defense against the threat of unauthorized control of vehicles.

In recent years, multiple devices called electronic control units (ECUs) are disposed in a system in an automobile. A network connecting these ECUs is referred to as an in-vehicle network. There are many standards for the in-vehicle network. One of the most dominant in-vehicle networks is the controller area network (CAN) defined in the ISO 11898-1.

In the CAN, a communication path includes two buses, and the ECUs connected to the buses are referred to as nodes. Each of the nodes connected to the buses transmits and receives messages called frames. In the CAN, there is no identifier indicating a destination node or a source node; a transmission node transmits each frame with ID called message ID attached thereto, and each reception node receives only the predetermined message ID. Therefore, there is a threat that a malicious user can wrongfully control an automobile by connecting an ECU to a bus of the CAN and using the ECU to transmit a frame including an anomalous control command by posing as an authorized ECU.

The method described in Japanese Unexamined Patent Application Publication No. 2014-146868, for example, is a method for detecting unauthorized control data injection into an in-vehicle network or the like to provide a defense against the above threat. However, an attack damage discovery point at which unauthorized control data injection by a cyberattack on a vehicle is discovered and an intrusion point at which unauthorized software is installed on a vehicle or an unauthorized device is installed on a vehicle do not necessarily match each other. Furthermore, there is the problem that identifying the intrusion point from the attack discovery point is not easy because vehicles are moving bodies and the period between an intrusion and attack damage discovery is not fixed.

Thus, the present disclosure is conceived to solve the aforementioned problems and provides an intrusion point identification device, etc., which identifies the intrusion point of a threat that has intruded into a moving body. More specifically, the present disclosure provides a device and a method for identifying an intrusion point by determining, using logs including threat information and position information of a plurality of vehicles, a point through which a relatively large number of vehicles among vehicles damaged by attacks have passed before the discovery of damage caused by the attack as being likely to be the intrusion point.

In order to solve such problems, an intrusion point identification device according to one aspect of the present disclosure identifies an intrusion point at which a threat intrudes into one or more moving bodies, each of the one or more moving bodies including a plurality of routes through which the threat may have intruded, the plurality of routes possibly including a first route through which the threat has intruded from a first attack source located within a predetermined distance from the moving body, and includes: an information collector that collects and stores threat information including identification information, route information, and discovery information, the identification information identifying a moving body into which the threat has intruded among the one or more moving bodies, the route information indicating a route through which the threat has intruded into the moving body among the plurality of routes included in the moving body, the discovery information indicating a discovery date of an attack by the threat that has intruded into the moving body; a log collector that collects logs, extracts, from the logs collected, histories of points that indicate locations of the one or more moving bodies have been within a predetermined period, and stores the histories of the points as history information, the logs indicating points that indicate locations of the one or more moving bodies in association with dates and times, the predetermined period being set based on the discovery information; an identification unit configured to identify an intrusion point of the threat from the first attack source through the first route among the points indicated in the history information stored in the log collector; and an outputter that outputs the intrusion point identified by the identification unit.

According to this aspect, the intrusion point identification device accumulates points at which one or more moving bodies have been and identifies, based on the accumulated points, a point at which a threat has intruded into a moving body. Here, it is assumed that the threat intruding into the moving body comes from an attack source within a predetermined distance from the moving body, and thus the attack sources of threats that have intruded into one or more moving bodies are assumed to be located within the predetermined distance from any of the points at which the one or more moving bodies have been. Therefore, the intrusion point identification device can identify an intrusion point at which a threat from an attack source has intruded into a moving body by accumulating points at which one or more moving bodies have been. Thus, the intrusion point identification device is capable of identifying the intrusion point of a threat that has intruded into a moving body.

For example, the threat information further includes incubation information indicating whether the threat has an incubation period, when the incubation information indicates that the threat has the incubation period, the incubation information further includes a length of the incubation period, and (a) when determining that the threat has the incubation period in the threat information, the log collector stores the history information using the predetermined period as a period having the length of the incubation period and terminating on the discovery date, and (b) when determining that the threat does not have the incubation period in the threat information, the log collector stores the history information using the predetermined period as a period having a predetermined length and terminating on the discovery date.

According to this aspect, the intrusion point identification device can easily accumulate the points at which the moving bodies have been by, when the threat has an incubation period, using the incubation period, and when the threat does not have an incubation period, using the period having the predetermined length, upon collecting the points at which the moving bodies have been. Thus, the intrusion point identification device is capable of more easily identifying the intrusion point of a threat that has intruded into a moving body.

For example, when the threat information indicates that the threat has intruded into the moving body through the first route, the identification unit is configured to set a score indicating a degree of anomaly to a value greater than zero for each of the points included in the history information stored in the log collector, when the threat information does not indicate that the threat has intruded into the moving body through the first route, the identification unit is configured to set the score to zero for each of the points included in the history information stored in the log collector, and for each of the points included in the history information stored in the log collector, the identification unit is configured to correct the score considering the degree of anomaly calculated based on the threat information, and the identification unit is configured to identify, as the intrusion point, a point having at least a predetermined value of the score after the correction.

According to this aspect, the intrusion point identification device calculates the degree of anomaly using the score for each of the points at which one or more moving bodies have been and identifies, using the calculated score, a point at which the threat has intruded into the moving body. Thus, on the basis of a specific process in which the score is used, the intrusion point identification device is capable of more easily identifying the intrusion point of a threat that has intruded into a moving body.

For example, when the threat information indicates that the threat has intruded into the moving body through the first route, the identification unit is configured to perform the correction by adding a greater value to the score as a severity level indicating severity of an impact the threat has on movement of the moving body increases.

According to this aspect, the intrusion point identification device corrects the score according to the severity level of a threat. Among cyberattacks on a moving body, a high-risk attack such as an attack that enables control over the operations of the moving body has a high severity level reported. In view of this, when the score for a point at which a higher-risk attack occurs is given a larger value in the calculation, a point having a higher score can be identified as a more dangerous intrusion point. Thus, the intrusion point identification device is capable of identifying the intrusion point of a threat that has intruded into a moving body, considering the severity level of the threat.

For example, the logs indicate the points that indicate locations of the one or more moving bodies and speeds of the one or more moving bodies in association with the dates and times, the log collector further extracts, from the logs collected, histories of the speeds of the one or more moving bodies within the predetermined period, and further stores the histories of the speeds as the history information, and when the threat information indicates that the threat has intruded into the moving body through the first route, the identification unit is configured to further perform the correction by adding a greater value to the score as a speed of the moving body approaches zero.

According to this aspect, the intrusion point identification device corrects the score according to the speed of the moving body. Generally, the intrusion means for a moving body such as physically mounting an unauthorized attack device or installing unauthorized software during charging is more likely to be executed when the moving body is stopped rather than when the moving body is travelling. In view of this, when the score for a point at which the vehicle has been stopped is given a larger value in the calculation than the score given for a point at which the vehicle has been travelling, a point at which many moving bodies have been stopped before being damaged by attacks is given a high score in the calculation and therefore can be identified as a more accurate intrusion point. Thus, the intrusion point identification device is capable of identifying the intrusion point of a threat that has intruded into a moving body, considering the speed of the moving body.

For example, the log collector further calculates and stores, for each of the points indicated in the history information stored in the log collector, a total number of moving bodies that have been at the point, and when the threat information indicates that the threat has intruded into the moving body through the first route, the identification unit is configured to further perform the correction to reduce the score further as the total number of the moving bodies that have been at the point increases.

According to this aspect, the intrusion point identification device corrects the score according to the number of travelling moving bodies. In a parking lot of a large-scale retail store, for example, a large number of moving bodies travel regardless of whether the moving bodies are damaged by attacks. Such a point at which a large number of moving bodies travel is given a low score while a point at which a small number of moving bodies travel is given a high score to eliminate the deviation depending on the point, making it possible to identify a more accurate intrusion point. Thus, the intrusion point identification device is capable of identifying the intrusion point of a threat that has intruded into a moving body, considering the number of travelling moving bodies.

For example, the threat includes a plurality of threats each belonging to one of a plurality of categories, and the identification unit is configured to further accumulate, for each of the plurality of categories to which the threat belongs, the score for each of the points included in the history information stored in the log collector, to calculate and store a cumulative score for the point in the category.

According to this aspect, the intrusion point identification device can identify a threat intrusion point using a cumulative score obtained by accumulating scores for each threat category. The cumulative score is calculated for each category of threats such as an attack carried out via a charging device and an attack carried out by mounting an unauthorized device, meaning that in the calculation, a high cumulative score is given to a point at which similar attacks that are likely to have intruded into moving bodies at the same point occur. Therefore, the use of the cumulative score makes it possible to identify a more accurate intrusion point. Thus, by way of identifying a point based on the threat category, the intrusion point identification device is capable of more accurately identifying the intrusion point of a threat that has intruded into a moving body.

For example, the outputter further displays, on a display screen, a map including the points included in the history information stored in the log collector, each of the points being displayed on the map using a graphic which increases in size or height in a three-dimensional view as the cumulative score for the point increases.

According to this aspect, the intrusion point identification device displays, together with a map, a graphic having a size or a height corresponding to the value of the score. When a point having a high cumulative score through which a moving body damaged by an attack has passed and information including a parking lot of a large-scale retail store or an installation site of a charging device are displayed together on a screen, the operation of switching pages to check what is present at a point having a high score is no longer necessary. Therefore, there is the advantage that a user can more efficiently identify the intrusion point. Thus, the intrusion point identification device is capable of identifying the intrusion point of a threat that has intruded into a moving body while presenting information about the intrusion point to a user.

For example, the information collector collects and stores threat information in a structured threat information eXpression (STIX) format as the threat information, and when an attack source class in a common vulnerability scoring system (CVSS) included in the threat information in the STIX format is physical, local, or adjacent, the identification unit is configured to determine that the threat has intruded into the moving body through the first route.

According to this aspect, the intrusion point identification device collects data that comply with standardized formats such as the STIX and the CVSS. This allows the intrusion point identification device to collect a larger volume of threat information and furthermore, determine, using the attack source class, whether an attack is possible within a predetermined distance, and thereby handle data of two or more pieces of the threat information in substantially the same manner. Moreover, since the deviation depending on an individual reporter becomes smaller, a more accurate intrusion point can be identified. Thus, the intrusion point identification device is capable of more accurately identifying, on the basis of the larger volume of threat information, the intrusion point of a threat that has intruded into a moving body.

For example, the log collector collects global positioning system logs of the one or more moving bodies as the logs, and stores the history information using, as the points, points each specified by predetermined latitude and longitude.

According to this aspect, the intrusion point identification device can use the position measurement of the GPS. The intrusion point identification device collects GPS logs used in many devices, regardless of whether such devices are embedded in or external to moving bodies, extracts points at each latitude and longitude with the same precision for the moving bodies, and calculates a score or a cumulative score for each of the points. Therefore, the intrusion point identification device can calculate a cumulative anomaly score from the position information of a larger number of moving bodies and can accordingly identify a more accurate intrusion point. Thus, the intrusion point identification device is capable of more accurately identifying, using the GPS, the intrusion point of a threat that has intruded into a moving body.

For example, the log collector stores the history information using, as the points, a point that indicates a location of a charging device, a parking lot, or a vehicle inspection site, the charging device being used to charge a vehicle which is the moving body.

According to this aspect, the intrusion point identification device identifies an intrusion point from points at which a charging device for vehicles, a parking lot, and a vehicle inspection site are located. The intrusion point identification device extracts the location of a charging device, a parking lot, or a vehicle inspection site as a point at which a threat is likely to intrude into a moving body, for example, by way of physically mounting an unauthorized attack device or installing unauthorized software during charging. Therefore, by calculating the score or the cumulative score for each of the aforementioned points, it is possible to remove a point at which a threat is less likely to intrude into a moving body. Thus, the intrusion point identification device is capable of efficiently identifying, by reducing the amount of calculation, the intrusion point of a threat that has intruded into a moving body.

For example, the intrusion point identification device further includes an anomaly detector which, (a) when the information collector receives threat information indicating that the threat has intruded into one of the one or more moving bodies, determines that the threat information received is anomalous, or (b) when the log collector receives a log indicating the intrusion of the threat, determines that the log received is anomalous, the information collector collects the threat information determined by the anomaly detector as being anomalous, and the log collector collects the log determined by the anomaly detector as being anomalous.

According to this aspect, when receiving threat information or a log related to the threat intrusion, the intrusion point identification device identifies a threat intrusion point on the basis of the threat information or the log. Therefore, the intrusion point identification device can identify the intrusion point by calculating the score or the cumulative score without human assistance after an attack on a moving body is detected in the threat information or the vehicle log, and thus the time between when the attack is discovered and when the intrusion point is identified can be reduced, enabling a further reduction in damage due to the attack. Thus, the intrusion point identification device is capable of more quickly identifying, on the basis of the anomaly detection, the intrusion point of a threat that has intruded into a moving body.

Furthermore, an intrusion point identification method according to one aspect of the present disclosure is an intrusion point identification method for identifying an intrusion point at which a threat intrudes into one or more moving bodies, each of the one or more moving bodies including a plurality of routes through which the threat may have intruded, the plurality of routes possibly including a first route through which the threat has intruded from a first attack source located within a predetermined distance from the moving body, and includes: collecting and storing threat information including identification information, route information, and discovery information, the identification information identifying a moving body into which the threat has intruded among the one or more moving bodies, the route information indicating a route through which the threat has intruded into the moving body among the plurality of routes included in the moving body, the discovery information indicating a discovery date of an attack by the threat that has intruded into the moving body; collecting logs, extracting, from the logs collected, histories of points that indicate locations of the one or more moving bodies within a predetermined period, and storing the histories of the points as history information, the logs indicating points that indicate locations of the one or more moving bodies in association with dates and times, the predetermined period being set based on the discovery information; identifying an intrusion point of the threat from the first attack source through the first route among the points indicated in the history information stored; and outputting the intrusion point identified.

This produces substantially the same advantageous effects as the above-described intrusion point identification device.

Note that these general aspects may be implemented using a system, a method, an integrated circuit, a computer program, or a computer-readable recording medium such as a compact disc read-only memory (CD-ROM), or any combination of systems, methods, integrated circuits, computer programs, or recording media.

Hereinafter, an intrusion point identification device according to an embodiment will be described with reference to the drawings.

Note that each of the embodiments described below shows a general or specific example. The numerical values, shapes, materials, structural elements, and the arrangement and connection of the structural elements, steps, and the processing order of the steps etc., shown in the following embodiment are mere examples, and are not intended to limit the present disclosure. Among the structural elements in the following embodiment, structural elements not recited in any one of the independent claims which indicate the broadest concepts will be described as arbitrary structural elements.

Embodiment

In the present embodiment, an intrusion point identification device which identifies the intrusion point of a threat that has intruded into a moving body will be described. In the following description, a vehicle is used as one example of the moving body.

[Diagram of Overall Configuration of Intrusion Point Identification System for Cyberattacks]

FIG. 1 is a diagram of the overall configuration of an intrusion point identification system for cyberattacks according to the present embodiment.

In FIG. 1, the intrusion point identification system for cyberattacks includes threat information shared server 20, vehicle log transmission device 30, and intrusion point identification device 10. Threat information shared server 20, vehicle log transmission device 30, and intrusion point identification device 10 are connected via an external network. One example of the external network is the Internet.

Threat information shared server 20 is a server that receives threat information from an analyzer and transmits the threat information to a user.

The threat information includes a document describing effects, causes, etc., of attacks analyzed by analyzers from system logs of vehicles that have been subject to the attacks after the discovery of damage to the vehicles caused by the cyberattacks. The threat information is described, for example, in a structured threat information eXpression (STIX) format. Note that the "vehicle that has been subject to an attack" will also be referred to as a target vehicle. Each of the system logs of the vehicles will also be referred to as a vehicle log and may also be simply referred to as a log.

The threat information described in the STIX format includes a cyberattack incident class (also referred to as a threat category), an attack detection method, an attack countermeasure method, the vulnerability of an attack target, the attack source class of vulnerability systematized using a common vulnerability scoring system (CVSS), the severity level of vulnerability, an attack discovery date, an incubation period that is the period between the intrusion and the occurrence of damage due to the attack, the vehicle identification number of a target vehicle, and the vehicle type of the target vehicle. Here, the incubation period is one example of the incubation information. The incubation period is information indicating whether the threat has an incubation period. When the incubation information indicates that the threat has an incubation period, the incubation information further includes the length of the incubation period.

In the CVSS, when a target component can be remotely attacked via a network, the attack source class is set to "network". When an adjacent network is required to attack a target component, the attack source class is set to "adjacent". When a local environment is required to attack a target component, the attack source class is set to "local". When a physically accessible environment is required to attack a target component, the attack source class is set to "physical".

Furthermore, in the CVSS, the severity level of vulnerability is represented by numerical values; the highest severity level is given 10 points while the non-severe level is given zero points. The severity level is an index indicating the severity of the impact the threat has on the operations of a vehicle.

The analyzer is a person who is able to analyze a cyberattack on a vehicle; examples of the analyzer include a security operation center, a security team, a vehicle manufacturer, an in-vehicle device developer, and a vulnerability discoverer.

The user is a person or a device that receives the threat information; examples of the user include a security operation center, a security team, and intrusion point identification device 10.

Vehicle log transmission device 30 is an electronic control device that transmits, to intrusion point identification device 10, a vehicle log including a vehicle identification number, the system log of a vehicle, a network log, position information, and a vehicle status. Vehicle log transmission device 30 transmits this log to intrusion point identification device 10 on a regular basis or after the discovery of damage due to the attack. Vehicle log transmission device 30 is installed on a vehicle.

The vehicle identification number is VIN. The system log of the vehicle is an operation log of vehicle control software mounted on an ECU. The network log is the traffic log of the CAN network. The position information is a log of a global positioning system (GPS). The vehicle status is the speed of the vehicle.

Intrusion point identification device 10 identifies an intrusion point at which a threat has intruded into a vehicle. Intrusion point identification device 10 receives threat information from threat information shared server 20 and collects vehicle logs from vehicle log transmission device 30. Furthermore, when receiving the threat information or when the vehicle log includes a security anomaly, intrusion point identification device 10 identifies, using the threat information and the vehicle log, an intrusion point of a threat that has intruded into the vehicle using an intrusion means that is effective only from an attack source located physically relatively close to the vehicle. The method for identifying an intrusion point will be described in detail later. Note that the "attack source located physically relatively close to the vehicle" can also be described as an attack source located within a predetermined distance from the vehicle.

The intrusion means that is effective only from an attack source located physically relatively close to the vehicle is, for example, installing unauthorized software from a charging device via a power line during charging of the vehicle parked on the side of the charging device. Other examples of the intrusion means may include installing unauthorized software on an in-vehicle infotainment device via the Bluetooth (registered trademark) communication while the vehicle is parked in a parking lot of a large-scale retail store and mounting an unauthorized device on an on-board diagnostics 2 (OBD2) port during repair of the vehicle by an unauthorized vehicle repairer.

An attacker can attack the vehicle to cause damage thereto by remotely transmitting an unauthorized control command from the unauthorized software or device to the in-vehicle network via the Internet after the threat successfully intrudes into the vehicle using the intrusion means that is effective only from an attack source located physically relatively close to the vehicle.

[Diagram of Configuration of Intrusion Point Identification Device]

Figure 2:
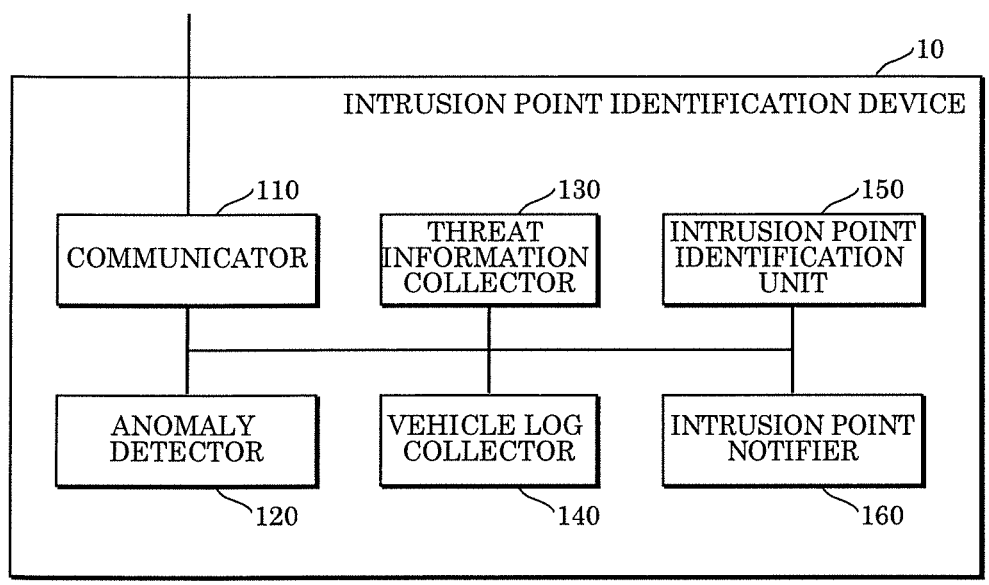
FIG. 2 is a diagram of the configuration of an intrusion point identification device according to an embodiment.

FIG. 2 is a diagram of the configuration of intrusion point identification device 10 according to the present embodiment. In FIG. 2, intrusion point identification device 10 includes communicator 110, anomaly detector 120, threat information collector 130, vehicle log collector 140, intrusion point identification unit 150, and intrusion point notifier 160. These structural elements can be implemented by a processor (not illustrated in the drawings) included in intrusion point identification device 10 executing programs using memory (not illustrated in the drawings).

Communicator 110 is a communication interface device connected to an external network. Communicator 110 receives the threat information from threat information shared server 20 and transfers the threat information to anomaly detector 120 and threat information collector 130. Furthermore, communicator 110 has the function of receiving the vehicle log from vehicle log transmission device 30 and transferring the vehicle log to anomaly detector 120 and vehicle log collector 140.

Anomaly detector 120 detects an anomaly in the threat information or the vehicle log. Anomaly detector 120 receives the threat information from communicator 110 and when the threat information includes a cyberattack on a target vehicle, determines the threat information as being anomalous and notifies threat information collector 130 of the threat information determined as being anomalous. Furthermore, anomaly detector 120 has the function of receiving the vehicle log from communicator 110 and when the vehicle log includes a security anomaly, determining the vehicle log as being anomalous and notifying threat information collector 130 of the vehicle log determined as being anomalous.

Threat information collector 130 receives the threat information from communicator 110 and stores the threat information. Threat information collector 130 collects the threat information from threat information shared server 20 via communicator 110. The threat information includes: identification information identifying a vehicle into which the threat has intruded among one or more vehicles; route information indicating a route through which the threat has intruded into the vehicle among a plurality of routes included in the vehicle; and discovery information indicating a discovery date of an attack resulting from the intrusion of the threat into the vehicle. Threat information collector 130 corresponds to the information collector.

Furthermore, threat information collector 130 receives the threat information determined by anomaly detector 120 as being anomalous. Moreover, when the attack source class of the vulnerability included in the threat information from anomaly detector 120 is "physical", "local", or "adjacent", threat information collector 130 determines that the threat has intruded into the vehicle from an attack source located physically relatively close to the vehicle. In addition, threat information collector 130 extracts the vehicle identification number, the threat category, the severity level of vulnerability, and the incubation period from the threat information, notifies vehicle log collector 140 of the vehicle identification number and the incubation period, and notifies intrusion point identification unit 150 of the vehicle identification number, the threat category, and the severity level of vulnerability.

Furthermore, threat information collector 130 receives the vehicle log determined by anomaly detector 120 as being anomalous. Moreover, threat information collector 130 specifies, in the threat information stored therein, threat information including a vehicle identification number that matches the vehicle identification number included in the vehicle log. Threat information collector 130 has the function of extracting the vehicle identification number, the threat category, the severity level of vulnerability, and the incubation period from the specified threat information, notifies vehicle log collector 140 of the vehicle identification number and the incubation period, and notifying intrusion point identification unit 150 of the vehicle identification number, the threat category, and the severity level of vulnerability.

Vehicle log collector 140 receives the vehicle log from communicator 110 and stores the vehicle log for each vehicle identification number included in the vehicle log. This vehicle log includes the vehicle log determined by anomaly detector 120 as being anomalous. Specifically, vehicle log collector 140 collects logs indicating points at which one or more vehicles are located in association with dates and times, extracts, from the collected logs, histories of points at which the one or more moving bodies have been within a predetermined period that is set based on the discovery information, and stores the histories of the points as history information. Vehicle log collector 140 corresponds to the log collector.

Furthermore, vehicle log collector 140 receives the vehicle identification number and the incubation period from threat information collector 130. Vehicle log collector 140 specifies, in the stored vehicle logs, a vehicle log that includes a matching vehicle identification number and corresponds to the incubation period, as an anomalous vehicle log. Vehicle log collector 140 defines, as a point, each of the regions obtained by dividing an area at an interval of 0°0'1" latitude and longitude, and extracts, from the anomalous vehicle log, an anomaly point through which the vehicle has travelled and a vehicle status at the anomaly point. Vehicle log collector 140 has the function of extracting the number of vehicles at the anomaly point from all the vehicle logs as a total number of vehicles, and notifying intrusion point identification unit 150 of the anomaly point, and an anomalous vehicle status and the total number of vehicles at the anomaly point.

Note that vehicle log collector 140 collects global positioning system (GPS) logs of the vehicle as the aforementioned logs, and stores the history information using, as the aforementioned points, points each specified by predetermined latitude and longitude. Furthermore, vehicle log collector 140 stores the history information using, as the aforementioned points, a point at which a charging device used to charge the vehicle, a parking lot, or a vehicle inspection site is located.

Intrusion point identification unit 150 identifies an intrusion point at which the threat has intruded into the vehicle from a first attack source through the first route among the points indicated in the history information stored in vehicle log collector 140. Intrusion point identification unit 150 corresponds to the identification unit.

Intrusion point identification unit 150 receives the vehicle identification number, the threat category, and the severity level of vulnerability from threat information collector 130. Intrusion point identification unit 150 receives, from vehicle log collector 140, the anomaly point and the anomalous vehicle status and the total number of vehicles at the anomaly point, calculates or collects the anomaly score for each point according to the anomalous vehicle status, the severity level of vulnerability, and the total number of vehicles for each anomaly point, and stores the anomaly score for each threat category.

The reference point of the anomaly score is set to 1. Intrusion point identification unit 150 calculates the anomaly score by adding, to the reference point, the point of the severity level in the CVSS that is defined using numerical values of 0 to 10, and when the anomalous vehicle status is "stopped", further adding 10 points, and dividing the result by the total number of vehicles, and stores the anomaly score for each threat category and each point.

Intrusion point identification unit 150 has the function of determining whether the sum of anomaly scores stored for each threat category and each point has exceeded 0.1.

Furthermore, intrusion point identification unit 150 determines that the point at which the sum of the anomaly scores has exceeded 0.1 is anomalous.

Intrusion point notifier 160 outputs the point identified by intrusion point identification unit 150. Intrusion point notifier 160 corresponds to the outputter.

Intrusion point notifier 160 receives, from intrusion point identification unit 150, the point determined by intrusion point identification unit 150 as being anomalous. Intrusion point notifier 160 displays, on a screen, map information and information of the anomaly score for each point. At this time, intrusion point notifier 160 may display the map information and the information of the anomaly score on top of each other on the screen. Intrusion point notifier 160 has the function of notifying a driver corresponding to the vehicle identification number or a driver of a vehicle of the type corresponding to the vehicle identification number of the point determined as being anomalous, and notifying the security team or the police of the point determined as being anomalous.

Here, when determining the threat information as indicating that the threat has the incubation period, vehicle log collector 140 stores the history information using, as the predetermined period, a period having the length of the incubation period and terminating on the discovery date. On the other hand, when determining the threat information as indicating that the threat does not have the incubation period, vehicle log collector 140 stores the history information using, as the predetermined period, a period having a predetermined length and terminating on the discovery date.

Furthermore, when the threat information indicates that the threat has intruded into the vehicle through the first route, intrusion point identification unit 150 sets a score indicating the degree of anomaly to a value greater than zero for each of the points included in the history information stored in vehicle log collector 140. On the other hand, when the threat information does not indicate that the threat has intruded into the vehicle through the first route, intrusion point identification unit 150 sets the score to zero for each of the points included in the history information stored in vehicle log collector 140. Subsequently, for each of the points included in the history information stored in vehicle log collector 140, intrusion point identification unit 150 corrects the score considering the degree of anomaly calculated based on the threat information, and identifies, as the intrusion point, a point having at least a predetermined value of the score after the correction.

The correction performed by intrusion point identification unit 150 will be described in detail.

When the threat information indicates that the threat has intruded into the vehicle through the first route, intrusion point identification unit 150 may perform the correction by adding a greater value to the score as the severity level indicating impact the threat has on movement of the vehicle increases.

Alternatively, when the threat information indicates that the threat has intruded into the vehicle through the first route, intrusion point identification unit 150 may perform the correction by adding a greater value to the score as the speed of the vehicle approaches zero. Suppose that the logs indicate the points at which one or more vehicles are located and the speeds of one or more vehicles in association with dates and times. In addition, vehicle log collector 140 further extracts, from the collected logs, histories of the speeds of one or more vehicles within the predetermined period, and stores the extracted histories of the speeds as the history information.

Furthermore, when the threat information indicates that the threat has intruded into the vehicle through the first route, intrusion point identification unit 150 may perform the correction to reduce the score further as the number of vehicles that have been at the point increases. In this case, suppose that vehicle log collector 140 calculates and stores, for each of the points indicated in the history information stored in vehicle log collector 140, the number of vehicles that have been at the point.

Note that intrusion point identification unit 150 may calculate and store a cumulative score for each of the points in each category by accumulating, for each category to which the threat belongs, the score for each of the points included in the history information stored in vehicle log collector 140.

[Threat Information]

FIG. 3 is a diagram illustrating one example of the threat information according to the present embodiment. The threat information illustrated in FIG. 3 is one example of the threat information that is transmitted from threat information shared server 20 to intrusion point identification device 10.

In FIG. 3, the threat information includes the set of the threat information number, the attack source class, the severity level of vulnerability, the threat category, the attack discovery date, the incubation period, the vehicle identification number, and the vehicle type.

As the attack source class, one of "physical", "local", "adjacent", and "network" is selected.

The threat information number is uniquely linked to each threat information.

As the severity level of vulnerability, one of 0 to 10 is selected.

FIG. 3 indicates, for example, that for the threat of threat information number 1, the attack source class is "physical", the severity level of vulnerability is "7", the threat category is "unauthorized OBD2 device", the incubation period is "unknown", the vehicle identification number is "A001", and the vehicle type is "A".

When the attack source class in the threat information is "physical", "adjacent", or "local", it is possible to determine that an attacker is present at a position physically relatively close to the vehicle or that an intrusion tool has been installed at a position physically relatively close to the vehicle.

Furthermore, the magnitude of damage caused by the attack can be determined by referring to the severity level of vulnerability in the threat information. It is possible to classify similar attacks by referring to the threat category. The period of the vehicle log to be checked can be determined by referring to the incubation period. The vehicle log corresponding to the vehicle identification number can be specified by referring to the vehicle identification number. By referring to the vehicle type, it is possible to classify the threat information for each of similar attacks on vehicles.

[Vehicle Log]

FIG. 4 is a diagram illustrating one example of the vehicle log according to the present embodiment, which is transmitted from vehicle log transmission device 30 to intrusion point identification device 10.

In FIG. 4, the vehicle log includes the set of the vehicle identification number, the time, the position information, and the vehicle status. FIG. 4 indicates, for example, that at time "T11", the vehicle having the vehicle identification number "A001" has been travelling at "10 km/h" through point A specified by latitude "N1 sec." and longitude "E1 sec.". Furthermore, FIG. 4 indicates that at time "T12", this vehicle having the vehicle identification number "A001" has been travelling at "20 km/h" through point B specified by "N2 seconds north" latitude and "E2 seconds east" longitude.

When the vehicle identification number of an abnormal vehicle is found, intrusion point identification unit 150 can specify, using the vehicle log, a predetermined period required for discovery of an attack, by referring to the time corresponding to the vehicle identification number of the abnormal vehicle. Furthermore, by referring to the position information corresponding to the vehicle identification number of the abnormal vehicle in the predetermined period, it is possible to extract a point through which the vehicle has passed, and by referring to the vehicle status, it is possible to determine whether the vehicle is stopped or travelling at each point. In the vehicle log, each of the regions obtained by dividing an area at an interval of 0° 0'1" latitude and longitude is defined as a point in the position information.

Furthermore, intrusion point identification unit 150 calculates the total number of vehicles from the vehicle log. The total number of vehicles is a numerical value representing the traffic of vehicles at a specific point within the predetermined period, and specifically indicates the sum of vehicles indicating normal and abnormal vehicles that have passed through the specific point within the predetermined period. The total number of vehicles is calculated using the vehicle identification number included in the vehicle log and associated with the specific position information within the predetermined period.

For example, in FIG. 4, there are two vehicle identification numbers, B001 and C001, as the vehicle located at point D corresponding to the specific position information in the predetermined period between T11 to T43; thus, the total number of vehicles at point D is determined as 2 in the calculation.

[Anomaly Score]

FIG. 5 is a diagram illustrating one example of the anomaly score calculated by intrusion point identification unit 150 according to the present embodiment. Note that the anomaly score will be referred to simply as a score.

In FIG. 5, the anomaly score includes the set of the threat information number, the threat category, the vehicle identification number, the position information, and the anomaly score calculation value. Furthermore, the anomaly score calculation value includes the reference point, the added point for the severity level, the added point for the vehicle status, the total number of vehicles, and the anomaly score.

In FIG. 5, the vehicle log for the vehicle identification number "A001" included in the threat information of the threat information number "1" is the vehicle log within the incubation period before the discovery of the attack or is the extracted position information for one day before the discovery of the attack. For example, in the vehicle log in FIG. 4, the points through which the vehicle having the vehicle identification number "A001" has passed in the period between time T11 and time T13 are "point A", "point B", and "point C".

In the threat information in FIG. 3, the attack source class of the threat having the threat information number "1" is "physical", meaning that the attacker or the intrusion tool is at a position physically relatively close to the vehicle. Therefore, intrusion point identification unit 150 gives "1" to the reference point in the anomaly score calculation value. Furthermore, when the attack source class is "physical", "adjacent", or "local", intrusion point identification unit 150 sets the reference point to a value greater than zero, more specifically, "1", while, when the attack source class is "network", intrusion point identification unit 150 sets the reference point to "0".

Furthermore, since the severity level of vulnerability is 7 in the threat information in FIG. 3, intrusion point identification unit 150 sets the added point for the severity level in the anomaly score calculation value to "7".

Moreover, since the vehicle status for the vehicle identification number "A001" at point A is "travelling" in the vehicle log in FIG. 4, intrusion point identification unit 150 sets the added point for the vehicle status in the anomaly score calculation value to "0".

The anomaly score in the anomaly score calculation value is set to a value obtained by dividing the sum of the reference point, the added point for the severity level, and the added point for the vehicle status by the total number of vehicles. In FIG. 5, since the total number of vehicles at point A is 100, the anomaly score for the vehicle identification number "A001" at "point A" is "0.08" as a result of dividing the sum "8" of the reference point, the added point for the severity level, and the added point for the vehicle status by the total number of vehicles at point A, i.e., "100".

In FIG. 5, the vehicle log for the vehicle identification number "B001" included in the threat information of the threat information number "2" is the vehicle log within the incubation period before the discovery of the attack or is the extracted position information for one day before the discovery of the attack. For example, in the vehicle log in FIG. 4, the points through which the vehicle having the vehicle identification number "B001" has passed in the period between time T21 and time T22 are "point D", "point E", and "point F".

In the threat information in FIG. 3, the attack source class of the threat having the threat information number "2" is "local", and thus the reference point in the anomaly score calculation value is given "1". Furthermore, in the threat information in FIG. 3, the severity level of vulnerability included in the threat information of the threat information number "2" is 6, and thus the added point for the severity level in the anomaly score calculation value is set to "6".

Moreover, since the vehicle status for the vehicle identification number "B001" at point D is "stopped" in the vehicle log in FIG. 4, intrusion point identification unit 150 sets the added point for the vehicle status in the anomaly score calculation value to "1". The probability of becoming an intrusion point for cyberattacks is higher in the case where the vehicle status is "stopped" rather than the case where the vehicle status is "travelling", and thus the added point for the vehicle status "stopped" is set to "1" greater than the added point for the vehicle status "travelling", i.e., "0". In FIG. 5, the anomaly score for the vehicle identification number "B001" at "point D" is "0.9" as a result of dividing the sum "9" of the reference point, the added point for the severity level, and the added point for the vehicle status by the total number of vehicles at point D, i.e., "10".

Furthermore, in the threat information in FIG. 3, the attack source class in the threat information of the threat having the threat information number "4" is "network", meaning that the attacker or the intrusion tool is not at a position physically relatively close to the vehicle. Thus, intrusion point identification unit 150 sets the reference point in the anomaly score calculation value to "0" and does not set the added point for the severity level and the added point for the vehicle status in the anomaly score calculation value.

In this manner, regarding the anomaly score, the attack source class in the threat information in FIG. 3 is referred to, and when the attack source class is "physical", "adjacent", or "local", the attacker or the intrusion tool is at a position physically relatively close to the vehicle and that position may become an intrusion point for cyberattacks, the reference point "1" is set. On the other hand, when the attack source class in the threat information is a network, the attacker or the intrusion tool does not need to be at a position physically relatively close to the vehicle, and thus the probability of that position becoming an intrusion point for cyberattacks is low, resulting in setting the reference point to "0" and setting the anomaly score to "0".

When the reference point in the anomaly score calculation value is set to "1", the added point for the severity level and the added point for the vehicle status can further be set. The added point for the severity level is set using the vulnerability in the threat information and can increase the anomaly score for the intrusion point of a high-risk attack having an increased severity level such as an attack that enables unauthorized control over the vehicle. The added point for the vehicle status is set using the vehicle status in the vehicle log and when the vehicle is travelling, can reduce the anomaly score because the probability of intrusion is low, and when the vehicle is stopped, can increase the anomaly score because the probability of intrusion is high.

For a point at which the total number of vehicles is large, the anomaly score is set small because a large number of vehicles, regardless of whether these vehicles are normal or abnormal, pass through the point. For a point at which the total number of vehicles is small, the anomaly score is set large because the point is a distinctive point at which the percentage of a normal vehicles is relatively high.

[Cumulative Anomaly Score]

FIG. 6 is a diagram illustrating one example of the cumulative anomaly score for each threat category and each point, calculated by intrusion point identification unit 150, according to the present embodiment.

In FIG. 6, the cumulative anomaly score includes the set of the threat category, the point, the anomaly score, and the cumulative anomaly score. The anomaly score includes two or more pieces of the threat information. The cumulative anomaly score is the result obtained by accumulating the anomaly score described with reference to FIG. 5.

In FIG. 6, a threat category to which the threat having the threat information number "1" belongs is the "unauthorized OBD2 device". The position information in the vehicle log that corresponds to the threat information number "1" includes points A, B, and C, and the anomaly scores for points A, B, and C are "0.08", "0.08", and "0.04", respectively. Points A, B, and C are not included in the position information in the vehicle log that corresponds to the other threat information, and thus the cumulative anomaly scores for points A, B, and C are "0.08", "0.08", and "0.04", respectively.

The position information in the vehicle log that corresponds to the threat information numbers "2" and "3" includes point D. The anomaly score for point D corresponding to the threat information number "2" is "0.8", and the anomaly score for point D corresponding to the threat information number "3" is "0.7". The cumulative anomaly score for point D is "1.5" that is the sum of the anomaly scores for point D corresponding to the threat information numbers "2" and "3".

In this manner, the anomaly scores in the two or more pieces of the threat information are referred to and added up for each threat category and each point and thus, it is possible to set the anomaly score high for a point through which, among vehicles damaged by similar attacks, a large number of vehicles have passed, in other words, travelled, before the discovery of the attacks.

[One Example of Visualized Cumulative Anomaly Score Display Screen]

Figure 7:
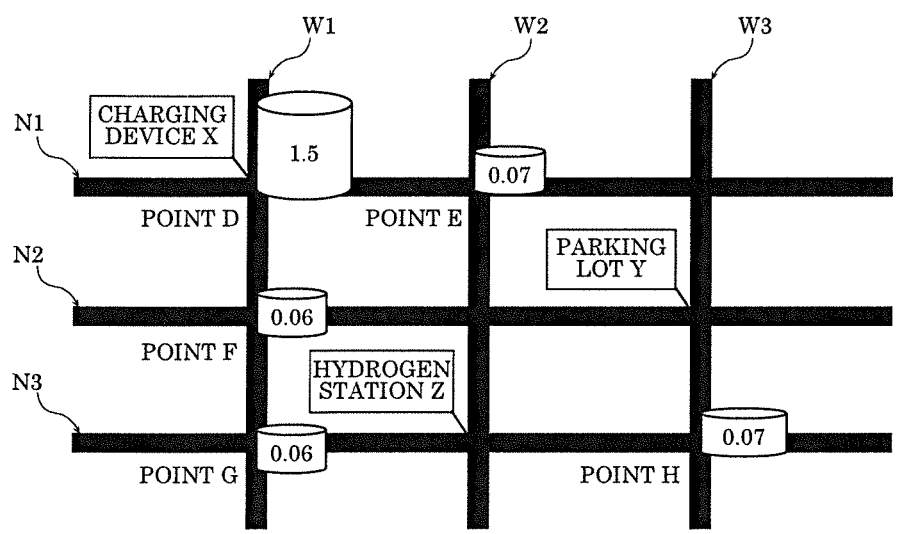
FIG. 7 is a diagram illustrating one example of a visualized cumulative anomaly score display screen according to an embodiment.
Figure 8:
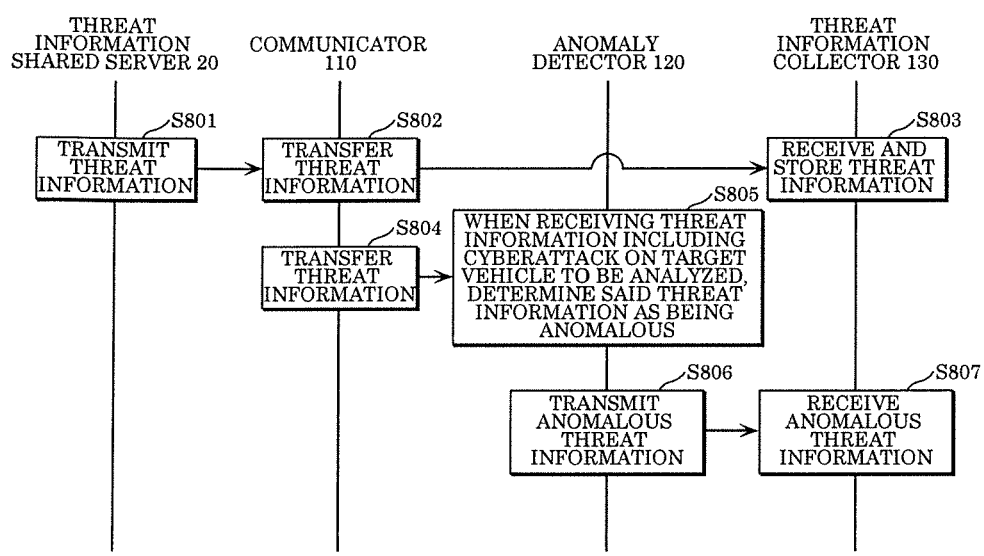
FIG. 8 is a diagram illustrating the sequence for a threat information anomaly detection process according to an embodiment.

FIG. 7 is a diagram illustrating one example of a screen according to the present embodiment on which intrusion point notifier 160 visualizes and displays the cumulative anomaly score. In FIG. 7, roads indicated by N1, N2, and N3 in longitude and roads indicated by W1, W2, and W3 in latitude are displayed on the map. Furthermore, the position and the name of charging device X located at the position indicated by N1 in longitude and W1 in latitude, the position and the name of parking lot Y located at the position indicated by N2 in longitude and W3 in latitude, and the position and the name of hydrogen station Z located at the position indicated by N3 in longitude and W2 in latitude are displayed.

In FIG. 7, intrusion point notifier 160 further displays the cumulative anomaly score. Intrusion point notifier 160 displays each point using a graphic which increases in size or height in a three-dimensional view as the cumulative anomaly score for the point increases. Specifically, intrusion point notifier 160 shows the cumulative anomaly score using the graphic of a column chart. The length or the size of the column chart displayed increases as the cumulative anomaly score increases. In the case of the three-dimensional view, the height of the column chart displayed increases as the cumulative anomaly score increases.

For example, intrusion point notifier 160 displays, as a graphic indicating the cumulative anomaly score for point D, i.e., 1.5, a column chart at the intersection of the road indicated by N1 in longitude and the road indicated by W1 in latitude. The size or the height of the displayed column chart correspond to the cumulative anomaly score for point D. In addition, the numerical value "1.5" of the cumulative anomaly score is displayed inside the displayed column chart. Furthermore, as a graphic indicating the cumulative anomaly score for point F, i.e., 0.06, a column chart is displayed at the intersection of the road indicated by N2 in longitude and the road indicated by W1 in latitude. The display details are the same as the above.

In this manner, intrusion point notifier 160 displays the cumulative anomaly score on the map in visualized form along with the name of the point that is likely to be an intrusion point, and thus a user can visually recognize what is present at a point having a high cumulative anomaly score, without switching pages that are displayed. This allows the user to efficiently identify an abnormal intrusion point.

[Process Sequence of Anomaly Detection Device]

FIG. 8 to FIG. 11 illustrate a process sequence in which, after threat information shared server 20 according to the present embodiment transmits the threat information to intrusion point identification device 10 or vehicle log transmission device 30 transmits the vehicle log to intrusion point identification device 10, intrusion point identification device 10 detects a security anomaly, calculates, for each threat category and each point, an anomaly score indicating the probability of an intrusion point, calculates a cumulative anomaly score for each threat category and each point, and identifies and reports the intrusion point.

In Step S801, threat information shared server 20 transmits the threat information to communicator 110 of intrusion point identification device 10. Threat information shared server 20 has received the threat information from an analyzer in advance. The information included in the threat information is as illustrated in FIG. 3. The analyzer is a person who is able to analyze a cyberattack on a vehicle from a vehicle log and the like; examples of the analyzer include a security operation center, a security team, a vehicle manufacturer, an in-vehicle device developer, and a vulnerability discoverer.

In Step S802, communicator 110 receives the threat information transmitted in Step S801 and transmits the received threat information to threat information collector 130, thereby transferring the threat information.

In Step S803, threat information collector 130 receives and stores the threat information transmitted in Step S802.

In Step S804, communicator 110 transmits, to anomaly detector 120, the threat information transmitted in Step S801 and received in Step S802, thereby transferring the threat information.

In Step S805, anomaly detector 120 receives the threat information transmitted in Step S804. When the received threat information includes a cyberattack on a target vehicle to be analyzed, anomaly detector 120 determines that the received threat information is anomalous. Here, the target vehicle to be analyzed is, for example, a vehicle provided by a specific manufacturer; in this case, when the threat information includes the vehicle identification number of a vehicle provided by the specific manufacturer, the threat information is determined as being anomalous.

In Step S806, when determining the threat information as being anomalous in Step S805, anomaly detector 120 transmits the anomalous threat information to threat information collector 130.

In Step S807, threat information collector 130 receives the anomalous threat information transmitted in Step S806.

Figure 9:
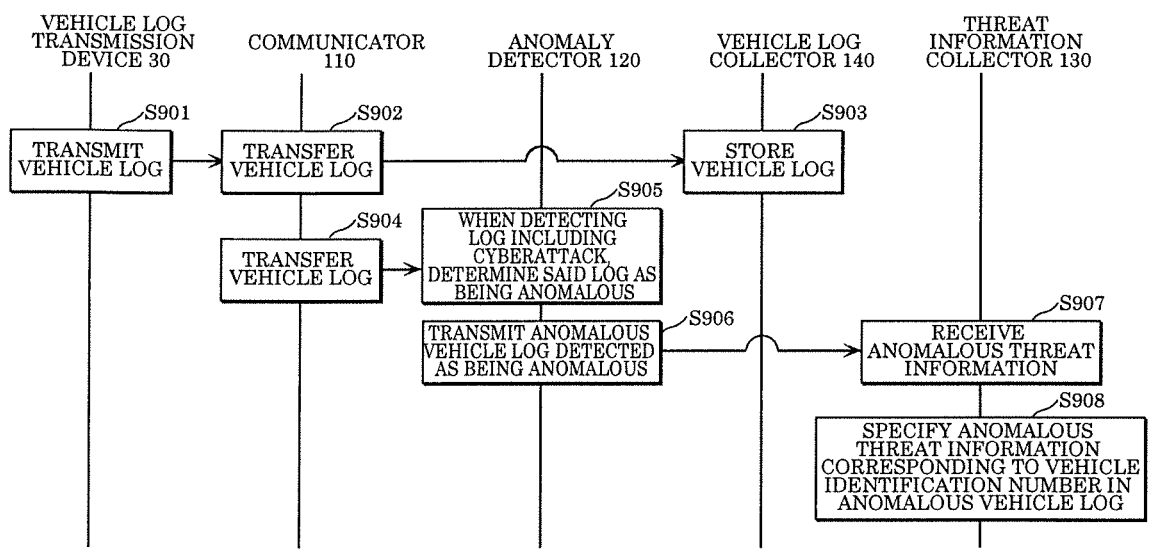
FIG. 9 is a diagram illustrating the sequence for a vehicle log anomaly detection process according to an embodiment.

Moving to FIG. 9, in Step S901, vehicle log transmission device 30 transmits the vehicle log to communicator 110 of intrusion point identification device 10. Here, the vehicle log is transmitted to intrusion point identification device 10 via the Internet, for example, using a communication protocol such as the hypertext transfer protocol (HTTP). The information included in the vehicle log is as illustrated in FIG. 4.

In Step S902, communicator 110 receives the vehicle log transmitted in Step S901 and transmits the received vehicle log to vehicle log collector 140, thereby transferring the vehicle log.

In Step S903, vehicle log collector 140 receives and stores the vehicle log transmitted in Step S902.

In Step S904, communicator 110 transmits, to anomaly detector 120, the vehicle log transmitted in Step S901 and received in Step S902, thereby transferring the vehicle log.

In Step S905, anomaly detector 120 receives the vehicle log transmitted in Step S904, and when detecting a log including a cyberattack in the received vehicle log, determines that the received vehicle log is anomalous. Here, as the method for detecting an anomaly from the vehicle log, for example, under the premise that the following rule is established in advance: when an instruction message of automated parking control that is activated only at a vehicle speed less than 10 km/h is transmitted during the travel at the vehicle speed of 100 km/h, this situation is detected as an anomaly, anomaly detector 120 monitors CAN network traffic in the vehicle log and when a vehicle log including a message that matches the rule is included, determines that the vehicle log is anomalous.

In Step S906, when determining the vehicle log as being anomalous in Step S905, anomaly detector 120 transmits the anomalous vehicle log to threat information collector 130.

In Step S907, threat information collector 130 receives the anomalous vehicle log transmitted in Step S906.

In Step S908, threat information collector 130 specifies anomalous threat information corresponding to the vehicle identification number included in the anomalous vehicle log received in Step S907. Here, the vehicle identification number is an unique value assigned to every vehicle, and since the vehicle identification number included in the threat information and the vehicle identification number included in the vehicle log are the same, the vehicle log and the threat information can be associated with each other.

Figure 10:
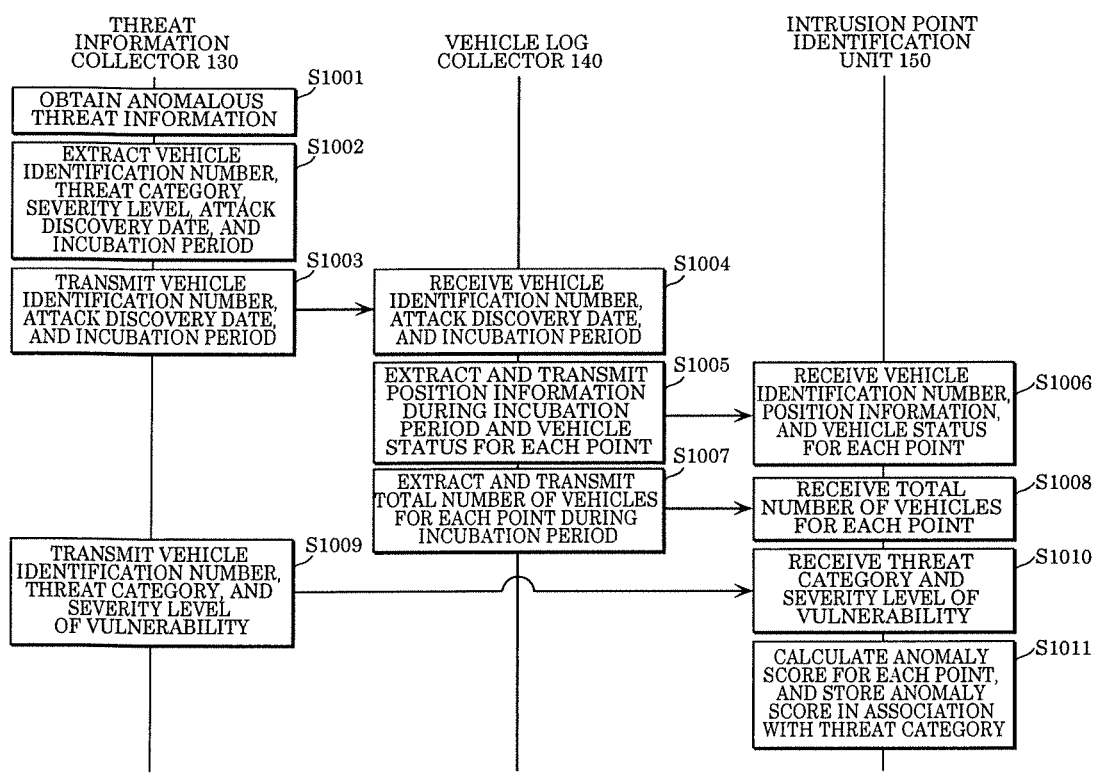
FIG. 10 is a diagram illustrating the sequence for an anomaly score calculation process according to an embodiment.

Moving to FIG. 10, in Step S1001, threat information collector 130 obtains the anomalous threat information. This process corresponds to the process in Step S807 or Step S908 in which threat information collector 130 receives or specifies the anomalous threat information.

In Step S1002, when the attack source class in the threat information obtained in Step S1001 is "physical", "local", or "adjacent", threat information collector 130 extracts the vehicle identification number, the threat category, the severity level, the attack discovery date, and the incubation period from the threat information. Here, when the incubation information included in the threat information indicates that the threat has no incubation period, a predetermined period, more specifically, a predetermined number of days, for example, one day, is used as the incubation period. The method for extracting the vehicle log during the incubation period will be described later with reference to FIG. 12.

In Step S1003, threat information collector 130 transmits, to vehicle log collector 140, the vehicle identification number, the attack discovery date, and the incubation period extracted in Step S1002.

In Step S1004, vehicle log collector 140 receives the vehicle identification number, the attack discovery date, and the incubation period transmitted in Step S1003.

In Step S1005, vehicle log collector 140 extracts the position information during the incubation period and the vehicle status for each point from the vehicle log corresponding to the vehicle identification number received in Step S1004, and transmits the position information during the incubation period and the vehicle status for each point to intrusion point identification unit 150. Here, each point is the point included in the position information and obtained by dividing an area at an interval of 0°0'1" latitude and longitude. The information included in the vehicle log includes time, the position information of the vehicle at the time, and speed information that is the vehicle status at the time, as illustrated in FIG. 4. For example, vehicle log collector 140 specifies a log during the incubation period by referring to the time in the vehicle log, and extracts the position information and the speed information in association, to extract the vehicle status for each predetermined point.

In Step S1006, intrusion point identification unit 150 receives the vehicle identification number, the position information, and the vehicle status for each point transmitted in Step S1005.

In Step S1007, vehicle log collector 140 extracts the number of vehicles for each point during the incubation period from all the vehicle logs stored in vehicle log collector 140 as a total number of vehicles, and transmits the total number of vehicles to intrusion point identification unit 150.

In Step S1008, intrusion point identification unit 150 receives the number of vehicles for each point transmitted in Step S1007.

In Step S1009, threat information collector 130 transmits, to intrusion point identification unit 150, the vehicle identification number, the threat category, and the severity level of vulnerability extracted in Step S1002. Here, the severity level of vulnerability is represented using the CVSS or the like and is a numerical value ranging from 0 points for the lowest severity level to 10 points for the highest severity level.

In Step S1010, intrusion point identification unit 150 receives the threat category and the severity level of vulnerability transmitted in Step S1009.

In Step S1011, using the position information, the vehicle status for each point, the total number of vehicles for each point, and the severity level of vulnerability received in Steps S1006, S1008, and S1010, intrusion point identification unit 150 calculates an anomaly score for each point and stores the anomaly score for each point in association with the threat category. The method for calculating the anomaly score will be described later with reference to FIG. 13.

Figure 11:
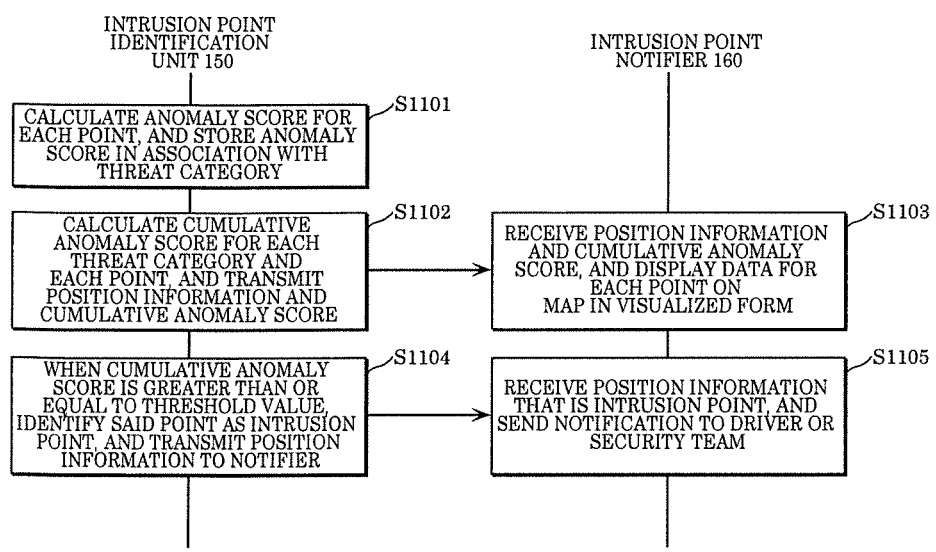
FIG. 11 is a diagram illustrating the sequence for an intrusion point identification process according to an embodiment.

Moving to FIG. 11, in Step S1101, intrusion point identification unit 150 calculates the anomaly score and stores the anomaly score in association with the threat category. This process corresponds to the process in Step S1011.

In Step S1102, intrusion point identification unit 150 calculates a cumulative anomaly score for each threat category and each point that have been stored in Step S1101, and transmits the position information and the cumulative anomaly score to intrusion point notifier 160. The method for calculating the cumulative anomaly score will be described later with reference to FIG. 14.

In Step S1103, intrusion point notifier 160 receives the position information and the cumulative anomaly score transmitted in Step S1102 and displays the corresponding data for each point on a map. The method for displaying the cumulative anomaly score is as illustrated in FIG. 7.

In Step S1104, when the cumulative anomaly score calculated in Step S1102 is greater than or equal to a threshold value, intrusion point identification unit 150 identifies said point as the intrusion point and transmits the position information to intrusion point notifier 160. Here, the threshold value has been held by intrusion point identification unit 150 in advance.

In Step S1105, intrusion point notifier 160 receives the position information transmitted in Step S1104, and notifies a driver or a security team of the position information. By reporting information about the intrusion point to the security team and the driver of a vehicle of the same vehicle type as the vehicle type included in the threat information, it is possible to enable a user to take a temporary measure such as avoiding approaching the intrusion point or quickly conduct an investigation of the area around the intrusion point, which enables a reduction in damage to vehicles that is caused by attacks.

[Flowchart of Vehicle Log Extraction Process]

Figure 12:
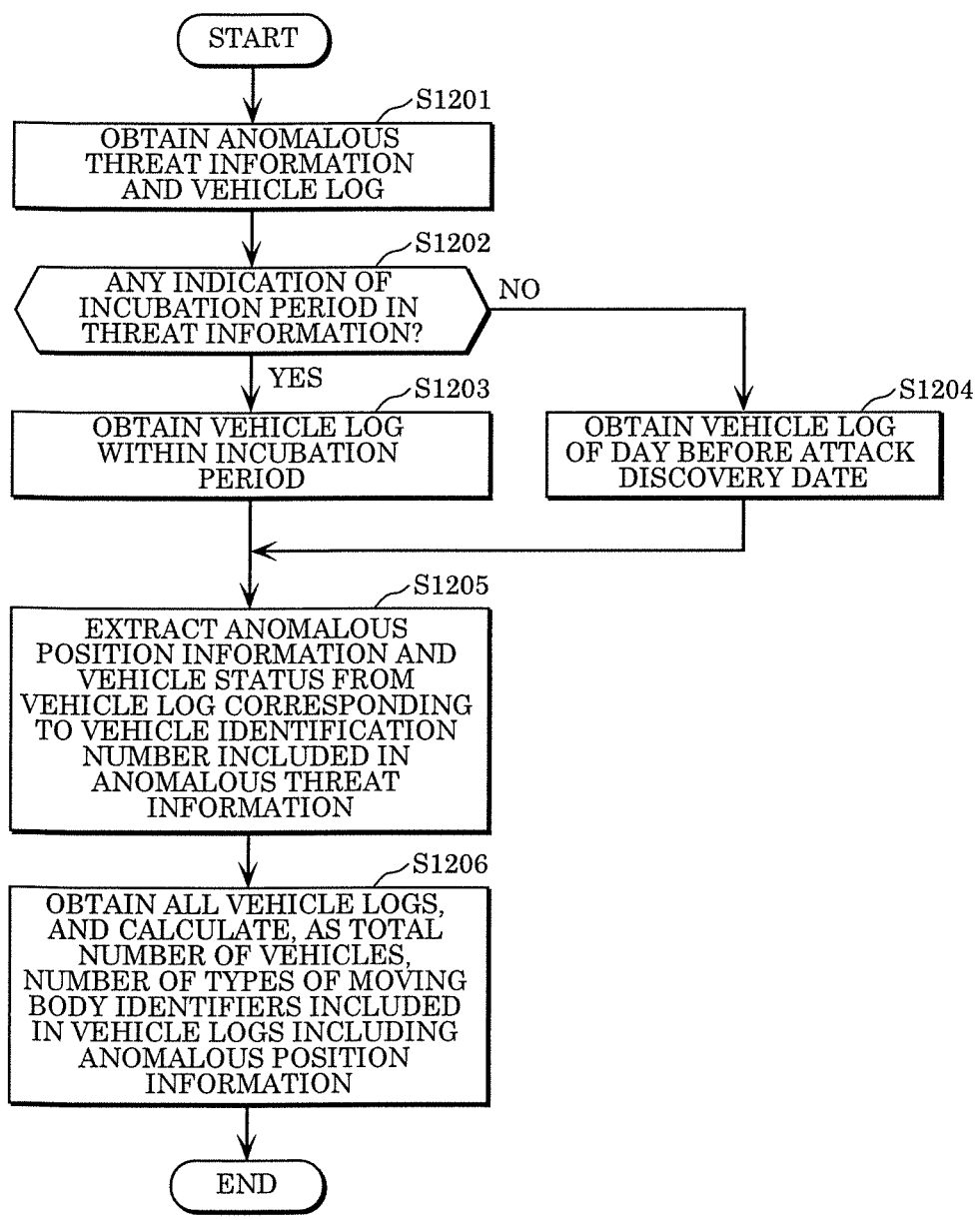
FIG. 12 is a flowchart of a vehicle log extraction process performed by a vehicle log collector according to an embodiment.

FIG. 12 is a flowchart of a vehicle log extraction process performed by vehicle log collector 140 according to the present embodiment.

In Step S1201, vehicle log collector 140 obtains the abnormal threat information and vehicle log and then performs Step S1202.

In Step S1202, vehicle log collector 140 determines whether the threat information includes an indication of the incubation period. When the threat information includes an indication of the incubation period (YES in Step S1202), Step S1203 is performed, whereas when the threat information does not include any indication of the incubation period (NO in Step S1202), Step S1204 is performed next. Note that the phrase "the threat information includes an indication of the incubation period" corresponds to the fact that the incubation information indicates that the threat has an incubation period.

In Step S1203, vehicle log collector 140 obtains, by referring to time information included in the vehicle log, the vehicle log within the incubation period indicated in the threat information, and then performs Step S1205.

In Step S1204, vehicle log collector 140 obtains the vehicle log by referring to the time information included in the vehicle log of the day before the attack discovery date (corresponding to the predetermined period) on the basis of the attack discovery date indicated in the threat information, and then performs Step S1205.

In Step S1205, vehicle log collector 140 specifies, in the vehicle log stored in vehicle log collector 140, a vehicle log corresponding to the vehicle identification number included in the anomalous threat information, extracts anomalous position information and the vehicle status including speed information associated with the anomalous position information, and then performs Step S1206.

In Step S1206, vehicle log collector 140 obtains all the vehicle logs stored in vehicle log collector 140 and calculates, as the total number of vehicles, the number of types of vehicle identification numbers included in vehicle logs including the anomalous position information used in Step S1205. As a result of using, as the total number of vehicles, the number of types of vehicle identification numbers included in vehicle logs including specific position information, even when the same vehicle has passed through the same point more than once, the total number of vehicles for the same point is counted as one, meaning that it is possible to avoid multiple counting of the same vehicle.

[Anomaly Score Calculation Flowchart]

Figure 13:
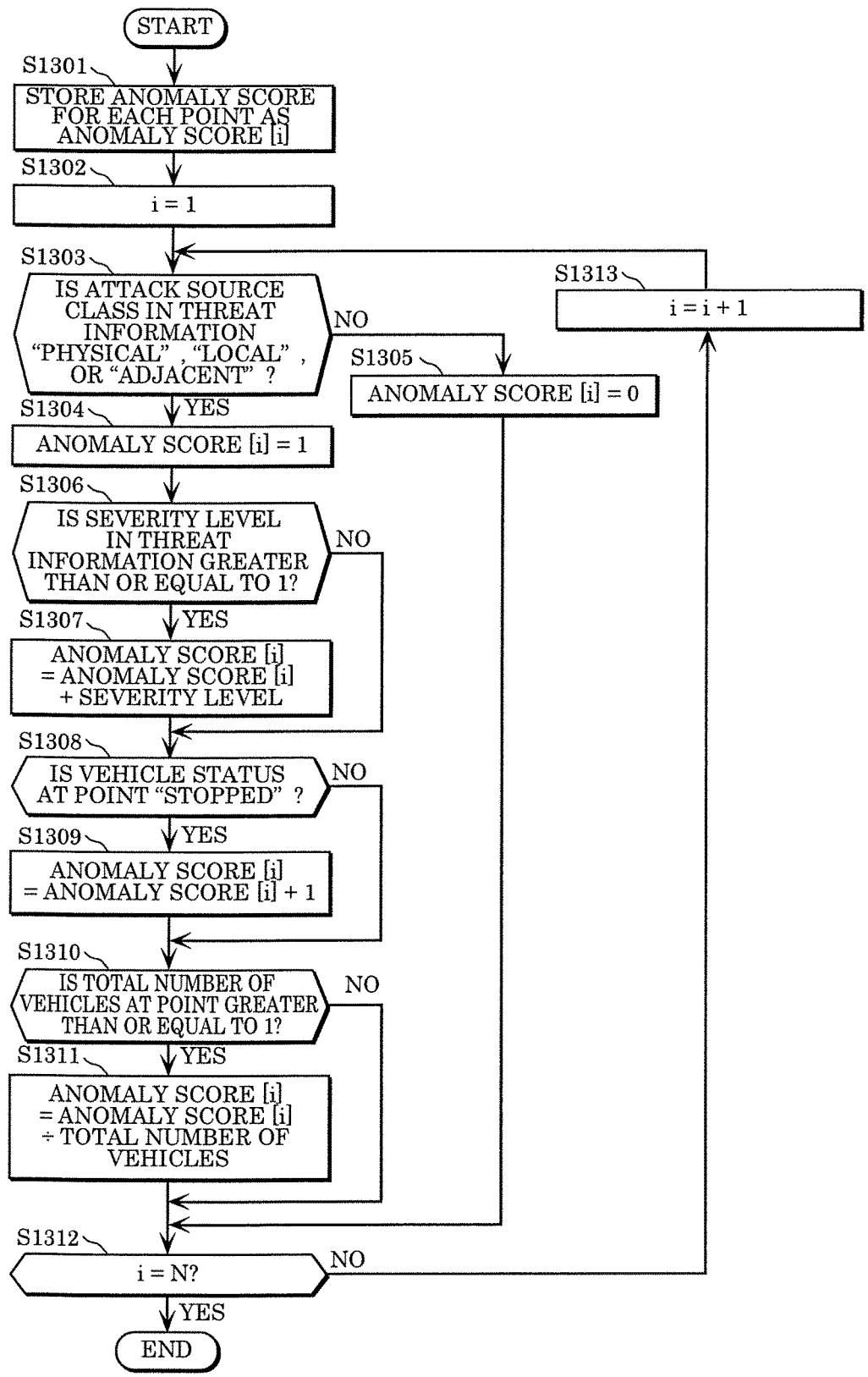
FIG. 13 is a flowchart of an anomaly score calculation and extraction process performed by an intrusion point identification unit according to an embodiment.

FIG. 13 is a flowchart of an anomaly score calculation and extraction process performed by intrusion point identification unit 150 according to the present embodiment.

In Step S1301, intrusion point identification unit 150 stores the anomaly score for each threat category and each point as an anomaly score [i], and then performs Step S1302. Here, i is an integer between 1 and N, inclusive, N is the number of points, and one point extracted by vehicle log collector 140 is identified using the value of i.

In Step S1302, intrusion point identification unit 150 stores the value of i as 1 and then performs Step S1303.

In Step S1303, intrusion point identification unit 150 refers to the threat information number corresponding to the value of i and determines whether or not the attack source class in the threat information is "physical", "adjacent", or "local". When the attack source class in the threat information is "physical", "adjacent", or "local", intrusion point identification unit 150 performs Step S1304 next. On the other hand, when the attack source class in the threat information is none of the above, intrusion point identification unit 150 performs Step S1305 next.

In Step S1304, intrusion point identification unit 150 stores the anomaly score [i] as 1 and then performs Step S1306.

In Step S1305, intrusion point identification unit 150 stores the anomaly score [i] as 0 and then performs Step S1312.

In Step S1306, intrusion point identification unit 150 refers to the threat information number corresponding to the value of i and determines whether or not the severity level in the threat information is greater than or equal to 1. When the severity level in the threat information is greater than or equal to 1, Step S1307 is performed next. On the other hand, when the severity level in the threat information is 0, Step S1308 is performed next. Here, the severity level is a value of 0 to 10 that complies with the CVSS and is defined as indicating a higher severity level as the value increases.

In Step S1307, intrusion point identification unit 150 adds the numerical value of the severity level to the value of the anomaly score [i], stores the result, and then performs Step S1308.

In Step S1308, intrusion point identification unit 150 refers to the vehicle status at the point corresponding the value of i extracted by vehicle log collector 140 corresponding to the value of i, and determines whether the vehicle status is "stopped". When the vehicle status is "stopped", Step S1309 is performed next. On the other hand, when the vehicle status is not "stopped", Step S1310 is performed. Here, the vehicle status includes speed information; when the speed of the vehicle is 0 km/h, the vehicle status is determined as "stopped".

In Step S1309, intrusion point identification unit 150 adds 1 to the value of the anomaly score stores the result, and then performs Step S1310. Note that instead of adding 1 to the value of the anomaly score [i], it is possible to double the value of the anomaly score [i] and store the result.

In Step S1310, intrusion point identification unit 150 refers to the total number of vehicles at the point corresponding the value of i extracted by vehicle log collector 140 corresponding to the value of i, and determines whether or not the total number of vehicles is greater than or equal to 1. When the total number of vehicles is greater than or equal to 1, Step S1311 is performed next. On the other hand, when the total number of vehicles is not greater than or equal to 1, Step S1312 is performed next.

In Step S1311, intrusion point identification unit 150 calculates and stores the value obtained by dividing the numerical value of the anomaly score [i] by the total number of vehicles, and then performs Step S1312.

In Step S1312, when the numerical value of i is N, intrusion point identification unit 150 stores the numerical value in association with the threat category, and ends this process. On the other hand, when the numerical value of i is not N, Step S1313 is performed next.

In Step S1313, intrusion point identification unit 150 stores, as i, the numerical value obtained by adding 1 to the numerical value of i, and then performs Step S1303.

[Intrusion Point Identification Flowchart]

Figure 14:
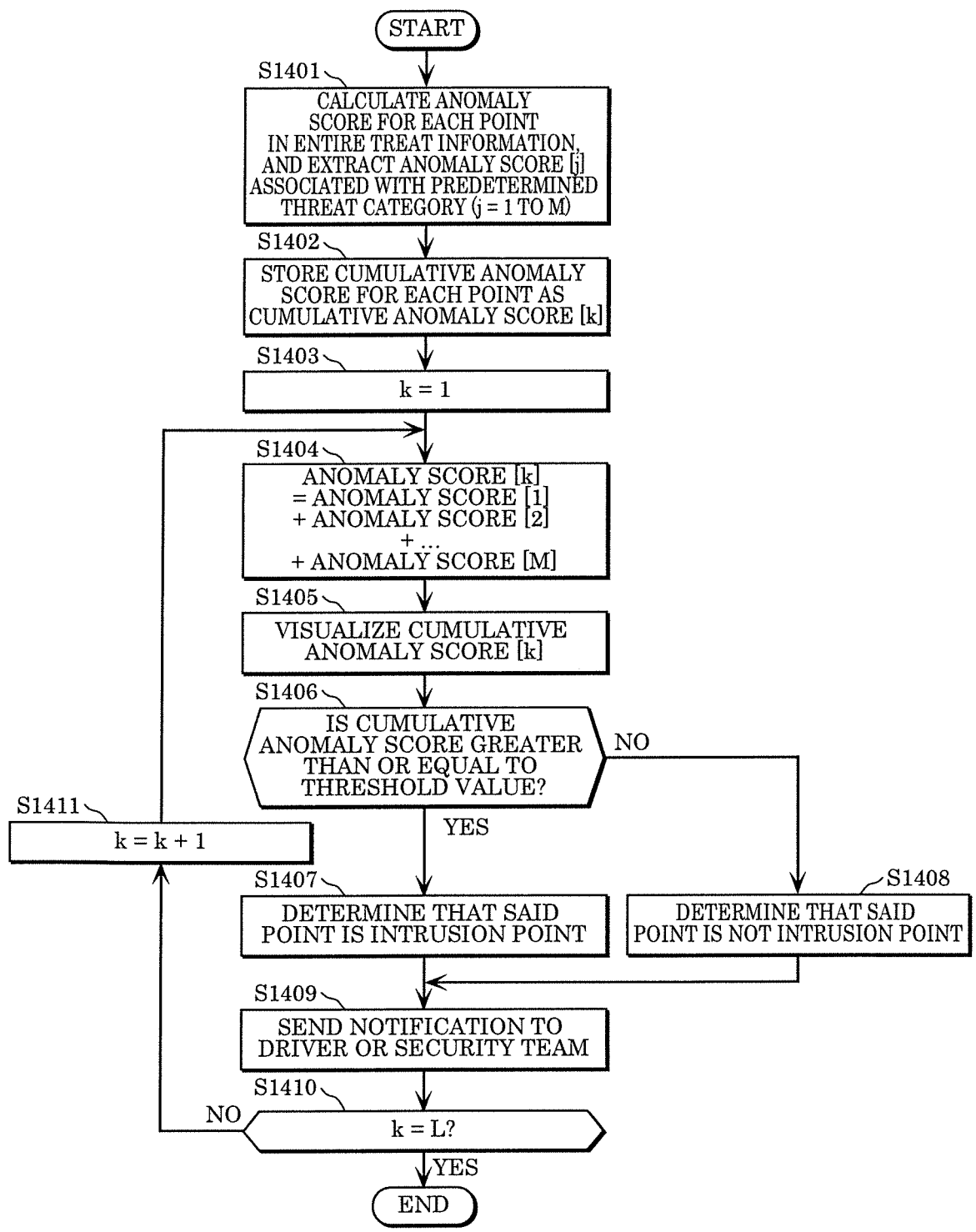
FIG. 14 is a flowchart of an intrusion point identification process performed by an intrusion point identification unit according to an embodiment.

FIG. 14 is a flowchart of an intrusion point identification process performed by intrusion point identification unit 150 according to the present embodiment.

In Step S1401, for each piece of the entire threat information stored in threat information collector 130, intrusion point identification unit 150 calculates the anomaly score for each point according to the anomaly score calculation flowchart from Step S1301 to Step S1313 (refer to FIG. 13), extracts the anomaly score [M] from the anomaly score [1] associated with a predetermined threat category, and then performs Step S1402. Here, M is the number of pieces of the threat information that corresponds to the predetermined threat category. The predetermined threat category is a threat category included in the threat information; the intrusion point identification flow is performed for each threat category.

In Step S1402, intrusion point identification unit 150 stores the cumulative anomaly score for each point as the cumulative anomaly score [k], and then performs Step S1403. Here, k is a numerical value of 1 to L where L is the total number of points, that is, the number of unique points included in the anomaly scores [1] to [M] that correspond to the predetermined threat category.

In Step S1403, intrusion point identification unit 150 stores 1 as k.

In Step S1404, intrusion point identification unit 150 calculates and stores the cumulative anomaly score [k] as the value obtained by adding all the anomaly scores from the anomaly score [1] to the anomaly score [M], and then performs Step S1405.

In Step S1405, intrusion point identification unit 150 transmits the position information and the cumulative anomaly score to intrusion point notifier 160, intrusion point notifier 160 displays the position information and the cumulative anomaly score, and then Step S1406 is performed next.

In Step S1406, intrusion point identification unit 150 determines whether or not the cumulative anomaly score is greater than or equal to a threshold value. When the cumulative anomaly score is greater than or equal to the threshold value, Step S1407 is performed next; otherwise, Step S1408 is performed next.

In Step S1407, intrusion point identification unit 150 determines that the point corresponding to the cumulative anomaly score is the intrusion point, and then performs Step S1409.

In Step S1408, intrusion point identification unit 150 determines that the point corresponding to the cumulative anomaly score is not the intrusion point, and then performs Step S1409.

In Step S1409, intrusion point identification unit 150 notifies a driver or a security team of the position information corresponding to the cumulative anomaly score, and then performs Step S1410.

In Step S1410, intrusion point identification unit 150 determines whether k is equal to L. When k is equal to L (YES in Step S1410), the series of processes illustrated in FIG. 14 end. On the other hand, when k is not equal to L (NO in Step S1410), Step S1411 is performed next.

In Step S1411, intrusion point identification unit 150 stores, as k, the numerical value obtained by adding 1 to the numerical value of k, and then performs Step S1404.

Other Embodiments

As described above, the embodiment is presented as an example of the technique according to the present disclosure. However, the technique according to the present disclosure is not limited to the foregoing embodiment, and can also be applied to embodiments to which a change, substitution, addition, omission, or the like is executed as necessary. For example, the following variations are included as embodiments of the present disclosure.

(1) Although the above embodiment is described as a security measure for automobiles, the applicable range is not limited to this example. Applicable examples include not only automobiles, but also mobility entities such as construction machines, farm machines, watercrafts, railways, and airplanes.

(2) In the above embodiment, intrusion point identification device 10 is described as including anomaly detector 120, but anomaly detector 120 is not an essential structural element. In the case where intrusion point identification unit 150 does not include anomaly detector 120, anomaly detector 120 may collect the threat information and the vehicle log and intrusion point identification unit 150 may calculate the anomaly score according to the timing of receiving the threat information from threat information shared server 20, the timing of manually finding anomaly, regular timing, or the timing of receiving an anomaly notification from an external system.

(3) In the above embodiment, vehicle log transmission device 30 is described as being installed inside a vehicle, but vehicle log transmission device 30 may be an edge server that collects and transmits two or more vehicle logs or may be a cloud server that collects vehicle logs.

(4) In the above embodiment, anomaly detector 120 is described as detecting an anomaly using CAN network traffic of the threat information or the vehicle log, but CAN-FD, Ethernet, LIN, or FlexRay may be used, the combination of these may be applied, and a system log that is output by a vehicle system may be used in such a manner that when the system log includes an error, the error is detected as an anomaly.

(5) In the above embodiment, threat information collector 130 is described as collecting the threat information illustrated in FIG. 3, but profiling information of an attacker which would be more helpful in cause analysis for the intrusion point may be collected.

(6) In the above embodiment, vehicle log collector 140 is described as collecting the vehicle log illustrated in FIG. 4, but the vehicle identification number may be an anonymous numerical value instead of a number given by a manufacturer to identify an individual. Furthermore, the time may be relative time instead of absolute time. The position information may be on a per minute basis or on a per degree basis instead of being on a per second basis. The vehicle status may be a label indicating "stopped" or "travelling" instead of raw data of the speed information.

(7) In the above embodiment, intrusion point identification unit 150 is described as calculating the anomaly score illustrated in FIG. 5 and storing the anomaly score for each threat category, but the anomaly score does not need to be stored in association with the threat category. In the case where the anomaly score is not stored in association with the threat category, intrusion point identification unit 150 may calculate the cumulative anomaly score for each point for every threat category instead of each threat category.

(8) In the above embodiment, intrusion point identification unit 150 is described as storing the anomaly score for each point illustrated in FIG. 5 that is obtained by dividing an area on the basis of the latitude and the longitude, but the anomaly score may be calculated for each arbitrary point such as a charging device, a hydrogen station, a filling station, a parking lot, a repair shop, a vehicle inspection office, a car hire agency, a carsharing agency, a car factory, an intersection, a road, or a traffic light, instead of each point obtained by dividing an area on the basis of the latitude and the longitude.

(9) In the above embodiment, intrusion point identification unit 150 is described as calculating the anomaly score illustrated in FIG. 5 using a reference point that is set to "1" in the case where an attack is possible at a predetermined distance by adding the point for the severity level in the CVSS, and when the vehicle status is "stopped", doubling the score, and dividing the score by the total number of vehicles, but the anomaly score may be calculated using any one of those or may be calculated using any combination of those.

(10) In the above embodiment, intrusion point identification unit 150 is described as calculating the anomaly score illustrated in FIG. 5, but the possible numerical value of the reference point may be an arbitrary value. The severity level may be manually determined without the use of the value in the CVSS, and the score to be added as the severity level may be an arbitrary value. Although the vehicle status is described as being selected from among two options, "stopped" and "travelling", the added point for the vehicle status may be changed to increase as the travelling speed of the vehicle is reduced and approaches the state of being "stopped", or the added point for the vehicle status does not need to be used in the division. The total number of vehicles may be stored not as the value of the total number of vehicles itself, but as the ratio indicating the number of anomalous vehicles out of the total number of vehicles.

(11) In the above embodiment, intrusion point identification unit 150 is described as identifying a point as the intrusion point when the cumulative anomaly score for the point is greater than or equal to the threshold value, but the threshold value may be set in advance or may be calculated from the ratio of the cumulative anomaly score to the total cumulative anomaly scores.

(12) In the above embodiment, intrusion point notifier 160 is described as displaying the cumulative anomaly score on the map, but the cumulative anomaly score may be displayed as a numerical value using a tabular format or may be displayed as a pop-up message.

(13) In the above embodiment, intrusion point notifier 160 is described as displaying the numerical value of the cumulative anomaly score using a graphic, but a color may be used to express and display the magnitude of the numerical value.

(14) In the above embodiment, intrusion point notifier 160 is described as displaying the cumulative anomaly score for each point on the map, a route connecting points through which an attacked vehicle has passed may be displayed on the map using a graphic, a color, or the like.

(15) In the above embodiment, intrusion point notifier 160 is described as receiving the information of the intrusion point from intrusion point identification unit 150 and then notifying a driver or a security team of the information, but the notification destination may be the police, the ministry of transport, or an organization that shares vulnerability information.

(16) Some or all of the structural elements included in each device in the above embodiment may be one system LSI (Large Scale Integration: large scale integrated circuit). The system LSI is a super multifunctional LSI manufactured by integrating a plurality of components onto a single chip. Specifically, the system LSI is a computer system configured of a microprocessor, read-only memory (ROM), random-access memory (RAM), and so on. A computer program is stored in the RAM. The system LSI achieves its function as a result of the microprocessor operating according to the computer program. Furthermore, each unit of the structural elements included in each device described above may be individually configured into single chips, or some or all of the units may be configured into a single chip. Moreover, although a system LSI is mentioned here, the integrated circuit can also be called an IC, a LSI, a super LSI, and an ultra LSI, depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used. In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(17) Furthermore, some or all of the structural elements included in each device described above may be implemented as a standalone module or an IC card that can be inserted into and removed from the device. The IC card or the module is a computer system made up of a microprocessor, ROM, RAM, and so on. The IC card or the module may include the aforementioned super multifunctional LSI. The IC card or the module achieves its functions as a result of the microprocessor operating according to the computer program. The IC card and the module may be tamperproof.

(18) One aspect of the present disclosure may be a program (computer program) implementing an intrusion point identification method with a computer or may be a digital signal of the computer program. Furthermore, one aspect of the present disclosure may be the computer program or the digital signal recorded on a computer-readable recording medium, such as a flexible disk, a hard disk, a compact disc (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be implemented as the digital signal recorded on these recoding media. Furthermore, one aspect of the present disclosure may be the computer program or the digital signal transmitted via an electrical communication line, a wireless or wired communication line, a network represented by the Internet, data broadcasting, or the like. Furthermore, one aspect of the present disclosure may be a computer system including a microprocessor and memory. The memory may store the computer program and the microprocessor may operate according to the computer program. Moreover, by transferring the recording medium having the program or the digital signal recorded thereon or by transferring the program or the digital signal via the network or the like, the present disclosure may be implemented by a different independent computer system.

(19) Embodiments realized by arbitrarily combining the structural elements and functions described in the above embodiment and variations are included in the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

An intrusion point identification device in an in-vehicle network system according to the present disclosure is applicable to a device that identifies an intrusion point of a threat that has intruded into a moving body. More specifically, using logs including threat information and position information of a plurality of vehicles, a point through which a large number of vehicles among vehicles damaged by attacks have passed before being damaged by attacks is determined as being likely to be the intrusion point, and thus it is possible to identify the intrusion point. As a result, a security team can be notified of the intrusion point and, for example, by investigating the surrounding area or giving warning to drivers to stay away from the area surrounding the intrusion point, it is possible to reduce further damage that would be caused by the attack, leading to an improvement in the safety of automobiles.

What is claimed is:

1. An intrusion point identification device that identifies an intrusion point at which a threat intrudes into one or more moving bodies, the intrusion point identification device comprising:
   a processor; and
   a memory including at least one set of instructions that, when executed by the processor causes the processor to perform operations including:
   collecting and storing threat information, the threat information including sets of (i) a threat information number uniquely linked to a moving body identification number identifying a moving body from among the one or more moving bodies into which the threat has intruded, (ii) route information indicating whether an attack by the threat that has intruded into the moving body is an attack by physical access or an attack remotely via a network, (iii) discovery information indicating a discovery date of the attack, and (iv) severity level of vulnerability for the threat;
   (i) collecting logs indicating points that indicate locations of the one or more moving bodies in association with dates and times, each of the points being one of a plurality of predetermined points, (ii) extracting, from the logs collected, histories of points that indicate locations of the one or more moving bodies within a predetermined period, the predetermined period being set based on the discovery information, and (iii) storing the histories of the points as history information;
   identifying an intrusion point of the threat from a first attack source located within a predetermined distance from the moving body by an attack among the points indicated in the history information; and
   outputting the intrusion point identified, wherein
   for each of the points indicated in the history information, the processor further calculates and stores a total number of moving bodies that have been at each point indicated in the history information,
   for each of the threat information numbers included in the threat information, the processor (i) extracts points of the moving body corresponding to the moving body identification number included in the history information and (ii) calculates a score indicating a degree of abnormality for each of extracted points by using the route information, the severity level of vulnerability, and the total number of moving bodies at each of the points, and
   the processor identifies the intrusion point of the threat according to the calculated scores.

2. The intrusion point identification device according to claim 1, wherein
   the threat information further includes incubation information indicating whether the threat has an incubation period, in each of the sets included in the threat information,
   when the incubation information indicates that the threat has the incubation period, the incubation information further includes a length of the incubation period, and
   (a) when determining that the threat has the incubation period in the threat information, the processor stores the history information using the predetermined period as a period having the length of the incubation period and terminating on the discovery date, and
   (b) when determining that the threat does not have the incubation period in the threat information, the processor stores the history information using the predetermined period as a period having a predetermined length and terminating on the discovery date.

3. The intrusion point identification device according to claim 1, wherein
in the identifying, when the threat information indicates that the attack by the threat that has intruded into the moving body is an attack by physical access, the processor sets a score indicating a degree of anomaly to a value greater than zero for each of the points included in the history information,
when the threat information indicates that the attack by the threat that has intruded into the moving body is an attack remotely via a network, the processor sets the score to zero for each of the points included in the history information,
for each of the points included in the history information, the processor corrects the score considering the degree of anomaly calculated based on the threat information, and
the processor identifies, as the intrusion point, a point having at least a predetermined value of the score after the correction.

4. The intrusion point identification device according to claim 3, wherein
in the identifying, when the threat information indicates that the attack by the threat that has intruded into the moving body is an attack by physical access, the processor performs the correction by adding a greater value to the score as a severity level indicating severity of an impact the threat has on movement of the moving body increases.

5. The intrusion point identification device according to claim 3, wherein
the processor stores a speed of the moving body in association with each of the points in the history information,
the processor further extracts, from the logs collected, histories of the speeds of the one or more moving bodies within the predetermined period, and further stores the histories of the speeds as the history information, and
in the identifying, when the threat information indicates that the attack by the threat that has intruded into the moving body is an attack by physical access, the processor performs the correction by adding a greater value to the score as a speed of the moving body approaches zero.

6. The intrusion point identification device according to claim 3, wherein
in the identifying, when the threat information indicates that the attack by the threat that has intruded into the moving body is an attack by physical access, the processor further performs the correction to reduce the score further as the total number of the moving bodies that have been at the point increases.

7. The intrusion point identification device according to claim 3, wherein
the threat information further includes one of a plurality of threat categories, in each of the sets of the threat information number, and
in the identifying, the processor further accumulates, for each of the plurality of categories, the score for each of the points included in the history information, to calculate and store a cumulative score for the point in the category.

8. The intrusion point identification device according to claim 7, wherein
in the outputting, the processor further displays, on a display screen, a map including the points included in the history information, each of the points being displayed on the map using a graphic which increases in size or height in a three-dimensional view as the cumulative score for the point increases.

9. The intrusion point identification device according to claim 1, wherein
the processor collects and stores threat information in a structured threat information eXpression (STIX) format as the threat information, and
in the identifying, when an attack source class in a common vulnerability scoring system (CVSS) included in the threat information in the STIX format is physical, local, or adjacent, the processor determines that the attack by the threat that has intruded into the moving body is an attack by physical access.

10. The intrusion point identification device according to claim 1, wherein
the processor collects global positioning system logs of the one or more moving bodies, and stores the history information using, as the points, points each specified by predetermined latitude and longitude.

11. The intrusion point identification device according to claim 1, wherein
the plurality of the predetermined points includes a point that indicates a location of a charging device, a parking lot, or a vehicle inspection site, the charging device being used to charge a vehicle which is the moving body.

12. The intrusion point identification device according to claim 1, wherein
the operations further include:
(a) when the processor receives threat information indicating that the threat has intruded into one of the one or more moving bodies, determining that the threat information received is anomalous, or (b) when the processor receives a log indicating the intrusion of the threat, determining that the log received is anomalous,
the processor collects the threat information determined as being anomalous, and
the processor collects the log determined as being anomalous.

13. An intrusion point identification method for identifying an intrusion point at which a threat intrudes into one or more moving bodies, the intrusion point identification method comprising, as information processing to be performed by a processor:
collecting and storing threat information, the threat information including sets of (i) a threat information number uniquely linked to a moving body identification number identifying a moving body from among the one or more moving bodies into which the threat has intruded, (ii) route information indicating whether an attack by the threat that has intruded into the moving body is an attack by physical access or an attack remotely via a network, (iii) discovery information indicating a discovery date of the attack, and (iv) severity level of vulnerability for the threat;
(i) collecting logs indicating points that indicate locations of the one or more moving bodies in association with dates and times, each of the points being one of a plurality of predetermined points, (ii) extracting, from the logs collected, histories of points that indicate locations of the one or more moving bodies within a predetermined period, the predetermined period being set based on the discovery information, and (iii) storing the histories of the points as history information;

identifying an intrusion point of the threat from a first attack source located within a predetermined distance from the moving body by an attack among the points indicated in the history information stored; and outputting the intrusion point identified, wherein for each of the points indicated in the history information, the collecting the logs includes further calculating and storing a total number of moving bodies that have been at each point indicated in the history information, the identifying includes, for each of the threat information numbers included in the threat information, (i) extracting points of the moving body corresponding to the moving body identification number included in the history information and (ii) calculating a score indicating a degree of abnormality for each of extracted points by using the route information, the severity level of vulnerability, and the total number of moving bodies at each of the points, and the intrusion point of the threat is identified according to the calculated scores.

14. A non-transitory computer-readable recording medium for use in a computer, the recording medium having recorded thereon a computer program for causing the computer to execute the intrusion point identification method according to claim 13.

15. An intrusion point identification system comprising: the intrusion point identification device according to claim 1; a threat information shared server; and a moving body, wherein the intrusion point identification device, the threat information shared server, and the moving body are connected by an external network.

* * * * *